US010025348B2

(12) United States Patent
Arima

(10) Patent No.: US 10,025,348 B2
(45) Date of Patent: Jul. 17, 2018

(54) ELECTRONIC DEVICE AND LOCKING MECHANISM

(71) Applicant: SONY CORPORATION, Tokyo (JP)

(72) Inventor: Kiyokuni Arima, Nagano (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/128,757

(22) PCT Filed: Mar. 6, 2015

(86) PCT No.: PCT/JP2015/056721
§ 371 (c)(1),
(2) Date: Sep. 23, 2016

(87) PCT Pub. No.: WO2015/151723
PCT Pub. Date: Oct. 8, 2015

(65) Prior Publication Data
US 2017/0108893 A1   Apr. 20, 2017

(30) Foreign Application Priority Data

Apr. 1, 2014   (JP) ................................. 2014-075502
Jun. 27, 2014   (JP) ................................. 2014-132601

(51) Int. Cl.
G06F 1/16   (2006.01)
H05K 5/00   (2006.01)
(Continued)

(52) U.S. Cl.
CPC .......... G06F 1/1616 (2013.01); E05B 13/004 (2013.01); E05B 63/20 (2013.01);
(Continued)

(58) Field of Classification Search
CPC .... G06F 1/1681; G06F 1/1616; G06F 1/1679; G06F 1/162; G06F 1/1618;
(Continued)

(56) References Cited

U.S. PATENT DOCUMENTS 5,489,924 A      2/1996   Shima et al.
2005/0052833 A1*  3/2005   Tanaka ................... G06F 1/162
                                                  361/679.21
2007/0228741 A1* 10/2007   Park ..................... G06F 1/1613
                                                  292/163

FOREIGN PATENT DOCUMENTS

CN   1591276 A    3/2005
EP   1513046 A2   3/2005
(Continued)

OTHER PUBLICATIONS

International Search Report and Written Opinion of PCT Application No. PCT/JP2015/056721, dated Apr. 28, 2015, 7 pages of English Translation and 7 pages of ISRWO.

Primary Examiner — James Wu
(74) Attorney, Agent, or Firm — Chip Law Group

(57) ABSTRACT

There is provided an electronic device including: a supporting body; a movable body provided in a movable manner with respect to the supporting body; and a locking mechanism configured to lock the movable body to the supporting body. The locking mechanism includes a locking member provided on the supporting body and configured to lock the movable body, a manipulating member connected to the locking member and provided such that the manipulating member is able to be moved between a locking position at which the movable body is locked by the locking member and a releasing position at which the locking of the movable body by the locking member is released, and a holding member configured to hold the manipulating member at the locking position or at the releasing position in accordance with a position of the movable body with respect to the supporting body.

11 Claims, 20 Drawing Sheets

(51) Int. Cl.
*H05K 7/00* (2006.01)
*E05B 65/00* (2006.01)
*E05C 9/04* (2006.01)
*E05B 63/20* (2006.01)
*E05B 13/00* (2006.01)

(52) U.S. Cl.
CPC ............ *E05B 65/0067* (2013.01); *E05C 9/04* (2013.01); *G06F 1/1637* (2013.01); *G06F 1/1679* (2013.01); *G06F 1/1681* (2013.01)

(58) Field of Classification Search
CPC .... Y10S 248/917; E05B 13/004; E05B 63/20; E05B 65/006; E05B 65/0067
See application file for complete search history.

(56) References Cited

FOREIGN PATENT DOCUMENTS

| | | | |
|---|---|---|---|
| JP | 05-165547 | A | 7/1993 |
| JP | 05-297980 | A | 11/1993 |
| JP | 06-59771 | A | 3/1994 |
| JP | 06059771 | A * | 3/1994 |
| JP | 2005-085260 | A | 3/2005 |
| JP | 2007-4212 | A | 1/2007 |

* cited by examiner

ELECTRONIC DEVICE AND LOCKING MECHANISM

CROSS REFERENCE TO RELATED APPLICATIONS

This application is a U.S. National Phase of International Patent Application No. PCT/JP2015/056721 filed on Mar. 6, 2015, which claims priority benefit of Japanese Patent Application No. JP 2014-075502 filed in the Japan Patent Office on Apr. 1, 2014 and Japanese Patent Application No. JP 2014-132601 filed in the Japan Patent Office on Jun. 27, 2014. Each of the above-referenced applications is hereby incorporated herein by reference in its entirety.

TECHNICAL FIELD

The present disclosure relates to an electronic device and a locking mechanism.

BACKGROUND ART

Electronic devices such as, for example, notebook type personal computers have been used as information processing devices. Such electronic devices include a first case body having manipulating keys, a second case body having a display panel, and a coupling member configured to connect the first case body and the second case body and are configured such that the second case body can be rotated with respect to the first case body.

Locking mechanisms have been used to lock the first case body and the second case body in such electronic devices, or the like. In addition, locking mechanisms are provided to mount batteries on the first case body. For example, Patent Literature 1 discloses that a user moves locking levers 34a and 35a in a width direction (an X axis direction) of a main body case body 21 so that a locked state and an unlocked state of a battery pack 40 are switched (paragraph 0021, or the like).

CITATION LIST

Patent Literature

Patent Literature 1: JP 2011-54363A

SUMMARY OF INVENTION

Technical Problem

However, in the above-described related art, when the user releases the locking of a movable body (the battery pack in Patent Literature 1), if his or her finger manipulating a manipulating member such as the locking levers is located in a movement direction of the movable body, his or her finger may interfere with the movable body when the movable body is moved (for example, when the battery pack is removed). In addition, if a locking structure in which the manipulating member is fixed at a lock releasing position is provided to solve this problem, there is a need for the user to move the manipulating member to a locking position when the movable body is moved again to the original position and locked. Thus, the number of manipulations according to the locking and the unlocking of the movable body is increased.

Therefore, it is necessary to facilitate a manipulation related to movement of the movable body.

Solution to Problem

According to the present disclosure, there is provided an electronic device including: a supporting body; a movable body provided in a movable manner with respect to the supporting body; and a locking mechanism configured to lock the movable body to the supporting body. The locking mechanism includes a locking member provided on the supporting body and configured to lock the movable body, a manipulating member connected to the locking member and provided such that the manipulating member is able to be moved between a locking position at which the movable body is locked by the locking member and a releasing position at which the locking of the movable body by the locking member is released, and a holding member configured to hold the manipulating member at the locking position or at the releasing position in accordance with a position of the movable body with respect to the supporting body.

According to the present disclosure, there is provided a locking mechanism including: a locking member provided on a supporting body and configured to lock a movable body provided in a movable manner with respect to the supporting body; a manipulating member connected to the locking member and provided such that the manipulating member is able to be moved between a locking position at which the movable body is locked by the locking member and a releasing position at which the locking of the movable body by the locking member is released; and a holding member configured to hold the manipulating member at the locking position or at the releasing position in accordance with a position of the movable body with respect to the supporting body.

According to the present disclosure, there is provided an electronic device including: a first member; a second member provided such that the second member is able to be relatively moved with respect to the first member; and a locking mechanism configured to lock the second member to the first member. The locking mechanism includes a locking member provided on the first member and configured to lock the second member, a manipulating member connected to the locking member and provided such that the manipulating member is able to be moved between a locking position at which the second member is locked by the locking member and a releasing position at which the locking of the second member by the locking member is released, and a holding member configured to hold the manipulating member at the locking position or at the releasing position in accordance with a position of the second member with respect to the first member.

According to the present disclosure, there is provided a locking mechanism including: a locking member provided on a first member and configured to lock a second member provided such that the second member is able to be relatively moved with respect to the first member; a manipulating member connected to the locking member and provided such that the manipulating member is able to be moved between a locking position at which the second member is locked by the locking member and a releasing position at which the locking of the second member by the locking member is released; and a holding member configured to hold the manipulating member at the locking position or at the releasing position in accordance with a position of the second member with respect to the first member.

Advantageous Effects of Invention

According to the present disclosure as described above, it is possible to facilitate a manipulation related to movement of a movable body.

Note that the effects described above are not necessarily limited, and along with or instead of the effects, any effect that is desired to be introduced in the present specification or other effects that can be expected from the present specification may be exhibited.

DESCRIPTION OF EMBODIMENT(S)

Figure 1:
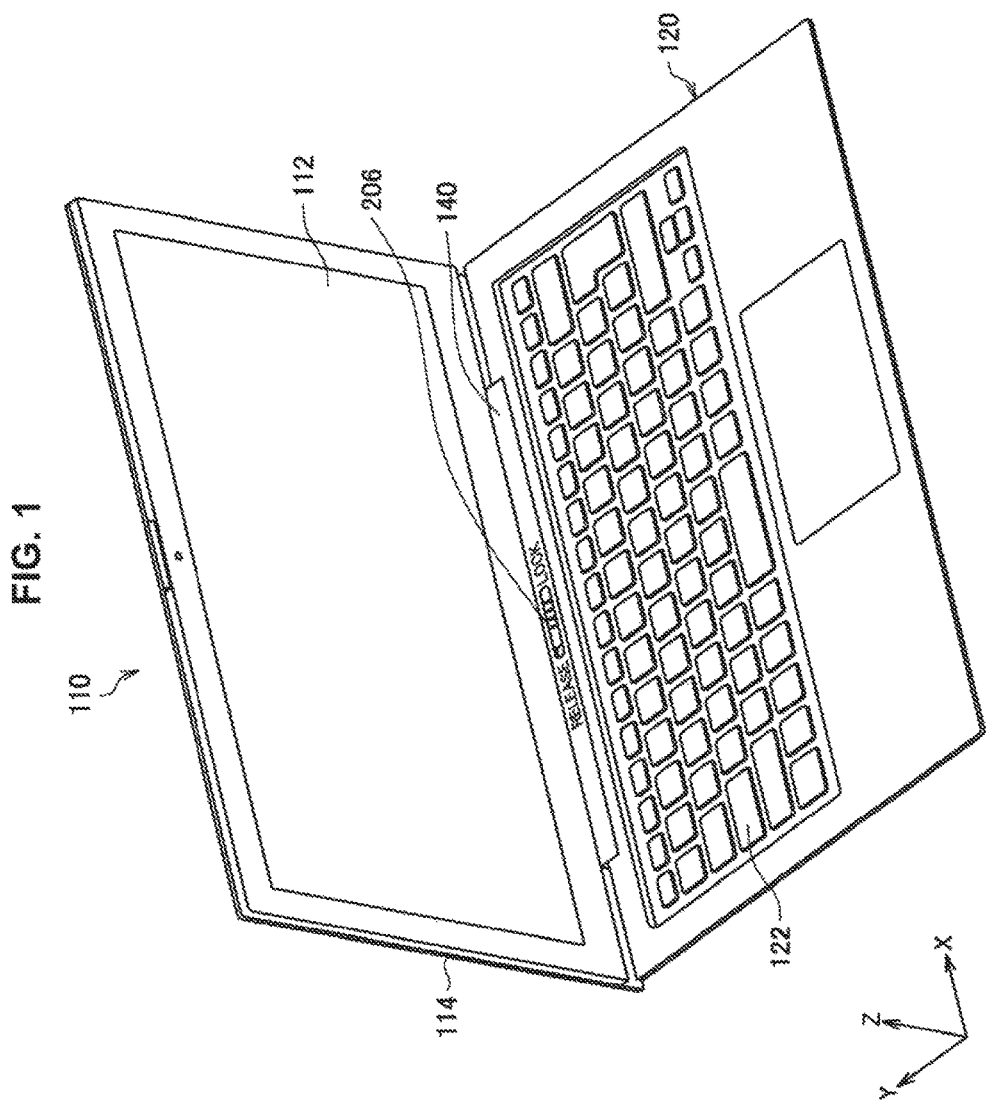
FIG. 1 is a perspective view showing an open state of an electronic device related to an embodiment of the present disclosure.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The present disclosure will be described in the following item order.

1. Schematic configuration of electronic device
2. State transition of electronic device
3. Arrangement of magnets
4. Configuration of locking mechanism
5. Action of locking mechanism
6. Conclusion

1. SCHEMATIC CONFIGURATION OF ELECTRONIC DEVICE

A schematic configuration of an electronic device 100 according to an embodiment of the present disclosure will be first described with reference to FIGS. 1 to 4.

Figure 2:
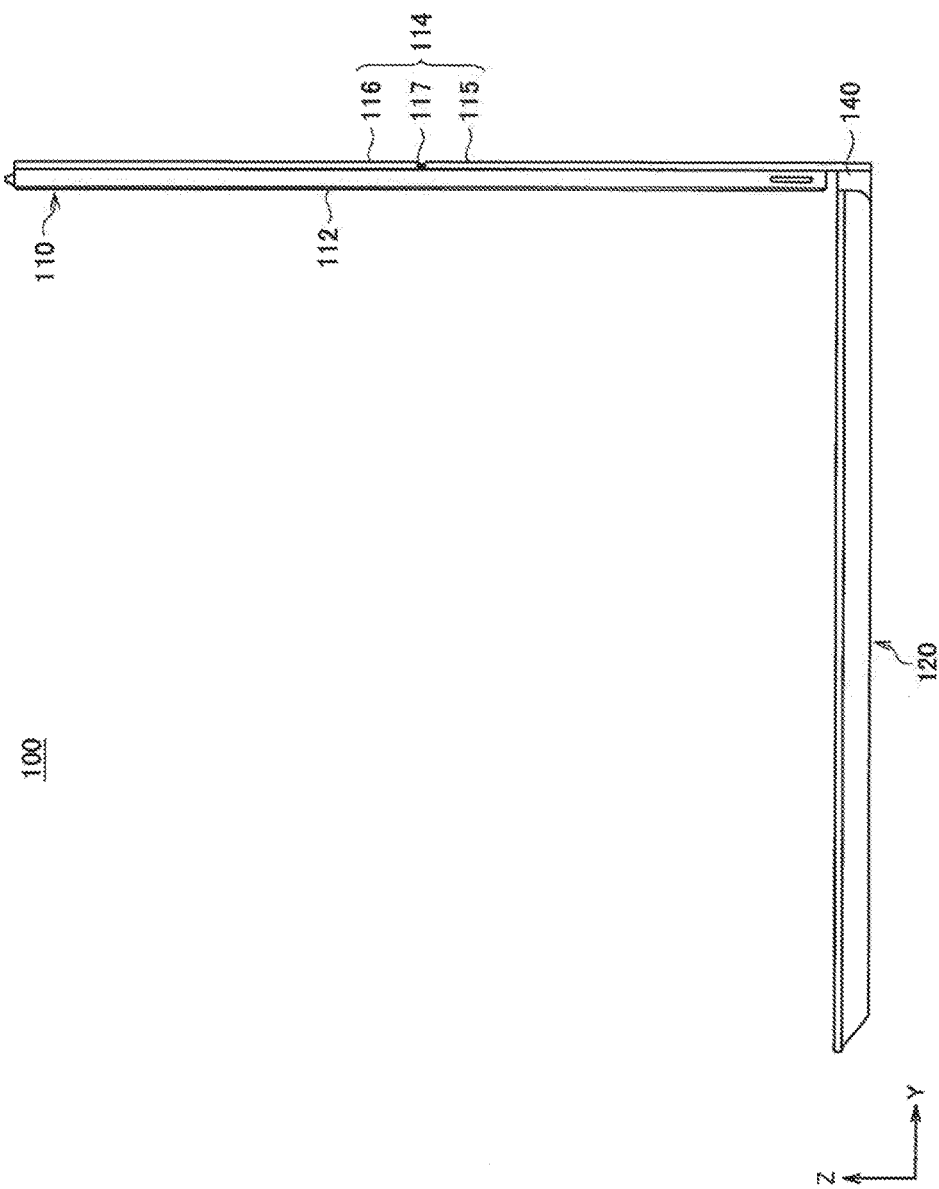
FIG. 2 is a side view showing the open state of the electronic device.
Figure 3:
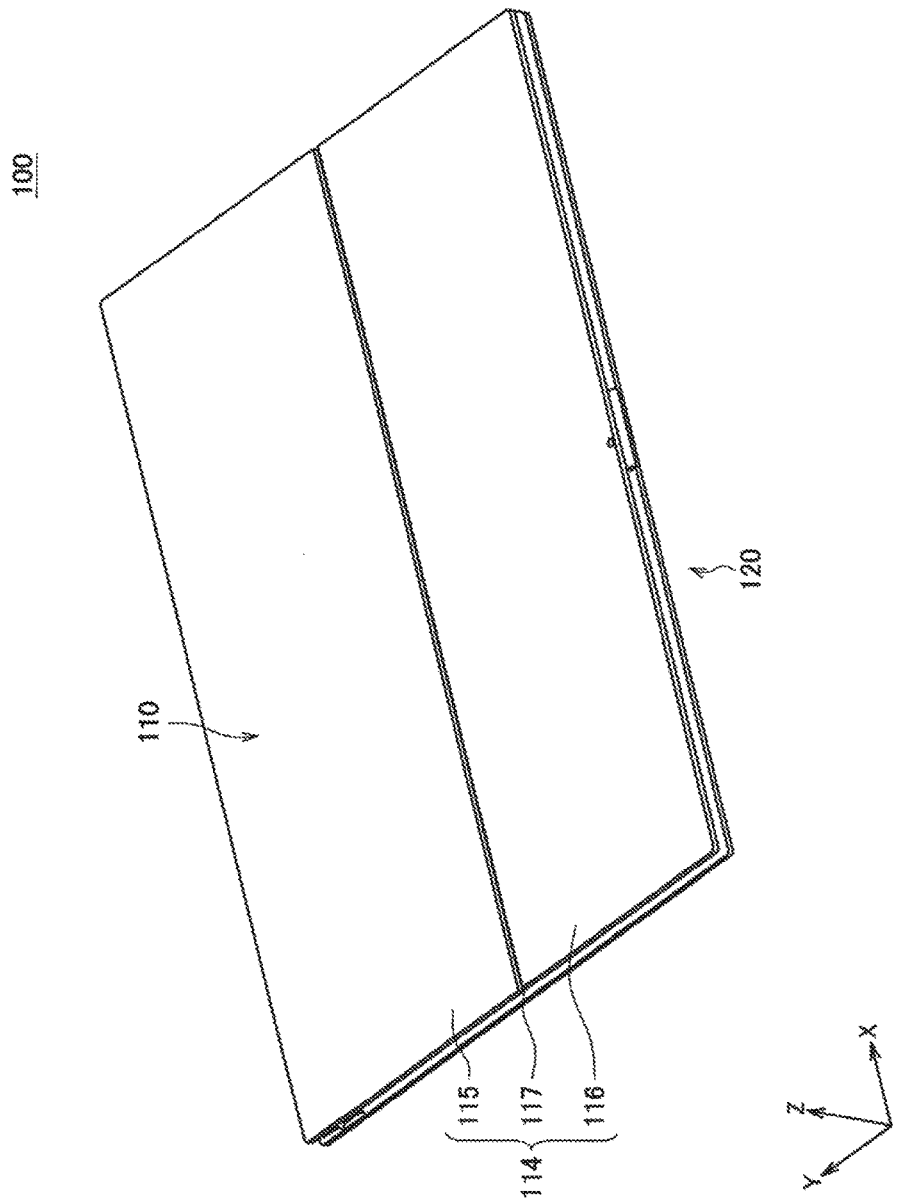
FIG. 3 is a perspective view showing a closed state of the electronic device.
Figure 4:
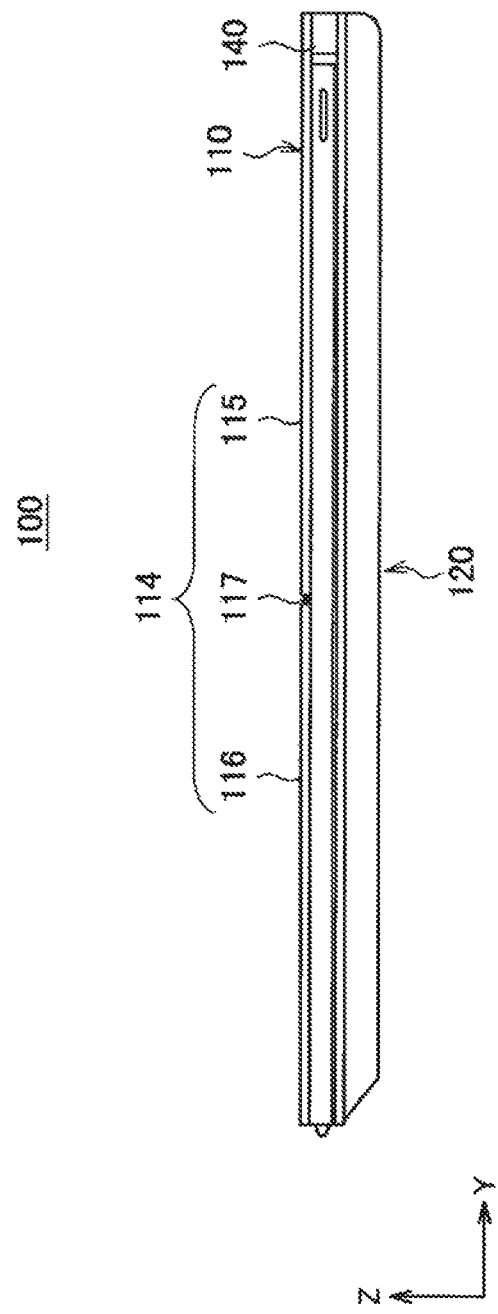
FIG. 4 is a side view showing the closed state of the electronic device.

FIG. 1 is a perspective view showing an open state of an electronic device 100 related to an embodiment of the present disclosure. FIG. 2 is a side view showing the open state of the electronic device 100. FIG. 3 is a perspective view showing a closed state of the electronic device 100. FIG. 4 is a side view showing the closed state of the electronic device 100.

As shown in FIGS. 1 to 4, the electronic device 100 related to the embodiment of the present disclosure is configured as a notebook type personal computer including, for example, a display-side case body 110 and a main-body-side case body 120. The display-side case body 110 and the main-body-side case body 120 have, for example, flat plate shapes and are formed in substantially the same planar size. Note that an X direction in the drawings corresponds to a width direction of the electronic device 100, a Y direction corresponds to a depth direction of the electronic device 100, and a Z direction corresponds to a height direction of the electronic device 100.

The display-side case body 110 and the main-body-side case body 120 are connected using a hinge mechanism (not shown) on an end at a depth side in a depth direction (the Y direction) of the main-body-side case body 120. The hinge mechanism rotatably couples the display-side case body 110 and the main-body-side case body 120 on a rotary shaft which extends in a case body width direction (the X direction). The display-side case body 110 can be rotated between the open state in which the display-side case body 110 is open with respect to the main-body-side case body 120 (FIGS. 1 and 2) and the closed state in which the display-side case body 110 is closed with respect to the main-body-side case body 120 (FIGS. 3 and 4) using this hinge mechanism.

The main-body-side case body 120 has an input unit (a manipulation input unit) 122 which receives an input manipulation of a user. As shown in FIG. 1, for example, the input unit 122 includes a keyboard, a touch pad, etc. The input unit 122 detects the input manipulation of the user and outputs electric signals corresponding to the input manipulation.

As shown in FIGS. 1 to 4, the display-side case body 110 has a display unit 112, a supporting plate 114, and a projecting portion 140. The display unit 112 is configured with a display device such as, for example, a liquid crystal display and has a display screen which displays various kinds of information. The display unit 112 overlaps a touch panel on which a touch manipulation of the user is possible. Therefore, the user can input a manipulation to the electronic device 100 by touching the display unit 112 even if the electronic device 100 is in a "tablet" state which will be described below. Note that, in the embodiment, a driving substrate used to control a display of the display unit 112 is provided inside the display-side case body 110 between the display-side case body 110 and the main-body-side case body 120. Also, the display unit 112 is an example of a movable body which can be moved with respect to the supporting plate 114.

The supporting plate 114 has substantially the same planar size as the display unit 112, is disposed at the rear side of the display unit 112, and supports the display unit 112. The supporting plate 114 has two portions, i.e., a first supporting portion (a supporting body) 115 and a second supporting portion 116 which are divided to surround a slight gap in the Y direction shown in FIG. 4 and a bent coupling portion 117 between the first supporting portion 115 and the second supporting portion 116.

The first supporting portion 115 is connected to a projecting portion 140 and serves as a supporting body which supports the second supporting portion 116 and the display unit (the movable body) 112. The second supporting portion 116 fixes and supports the display unit 112 at the rear side of the display unit 112. The first supporting portion 115 and the second supporting portion 116 are supporting plates whose planar sizes are substantially the same. Also, a thickness of the first supporting portion 115 is the same size as a thickness of the second supporting portion 116. Thus, as shown in FIGS. 3 and 4, the first supporting portion 115 and the second supporting portion 116 constitute a flat top plate when the display-side case body 110 is in the closed state.

As shown in FIG. 4, the bent coupling portion 117 serving as a coupling portion with flexibility which rotatably couples the second supporting portion 116 to the first supporting portion 115 is provided between the first supporting portion 115 and the second supporting portion 116. The bent coupling portion 117 has a configuration in which the bent coupling portion 117 is more pliable and easily folded. Also, the second supporting portion 116 to which the display unit 112 is fixed is rotated with respect to the first supporting portion 115 when the bent coupling portion 117 is folded. In other words, in the embodiment, a structure state of the electronic device 100 is changed among a plurality of states using the hinge mechanism, which couples the display-side case body 110 to the main-body-side case body 120, and the bent coupling portion 117. The plurality of states which can be attained by the electronic device 100 will be described below in "2. State transition of electronic device."

As shown in FIGS. 1, 2, and 4, the projecting portion 140 is fixed to the first supporting portion 115. The projecting portion 140 projects from a lower side of the first supporting portion 115 toward the main-body-side case body 120 and extends in the X direction along the lower side of the first supporting portion 115. Also, the projecting portion 140 is connected to the main-body-side case body 120 to be rotatable about the rotary shaft in the case body width direction (the X direction) using the hinge mechanism (not shown). Thus, the projecting portion 140 can be rotated with respect to the main-body-side case body 120, and the first supporting portion 115, the second supporting portion 116, and the display unit 112 are also rotated with respect to the main-body-side case body 120 according to rotation of the projecting portion 140 with respect to the main-body-side case body 120.

Also, a locking mechanism by which the rotation of the display unit 112 with respect to the first supporting portion 115 is controlled is disposed inside the projecting portion 140 and on an end of the first supporting portion 115 at the projecting portion 140 side. As shown in FIG. 1, the locking mechanism includes a lever 206 exposed from a surface of the projecting portion 140. The lever 206 constitutes a manipulating member manipulated by the user to transition a state of the electronic device 100 and move between the locking position and the releasing position. For example, when the lever 206 is at the locking position, the display unit 112 is locked into the first supporting portion 115 so that the display unit 112 is not rotated with respect to the first supporting portion 115. On the other hand, when the user moves the lever 206 from the locking position to the releasing position, locking of the display unit 112 into the first supporting portion 115 is released so that the display unit 112 can be rotated with respect to the first supporting portion 115. The locking mechanism including the lever 206 will be described in the following "4. Configuration of locking mechanism."

2. STATE TRANSITION OF ELECTRONIC DEVICE

The schematic configuration of the electronic device 100 related to the embodiment has been described above with reference to FIGS. 1 to 4. The above-described electronic device 100 can be transitioned among the plurality of structure states including the open state shown in FIG. 1 (hereinafter referred to as a "clamshell" state), the closed state shown in FIG. 3, a "flipped" state, a "tablet" state, etc. A state transition between the "clamshell" state and the "tablet" state will be described below with reference to FIGS. 5 to 10 as well as FIG. 1.

Figure 5:
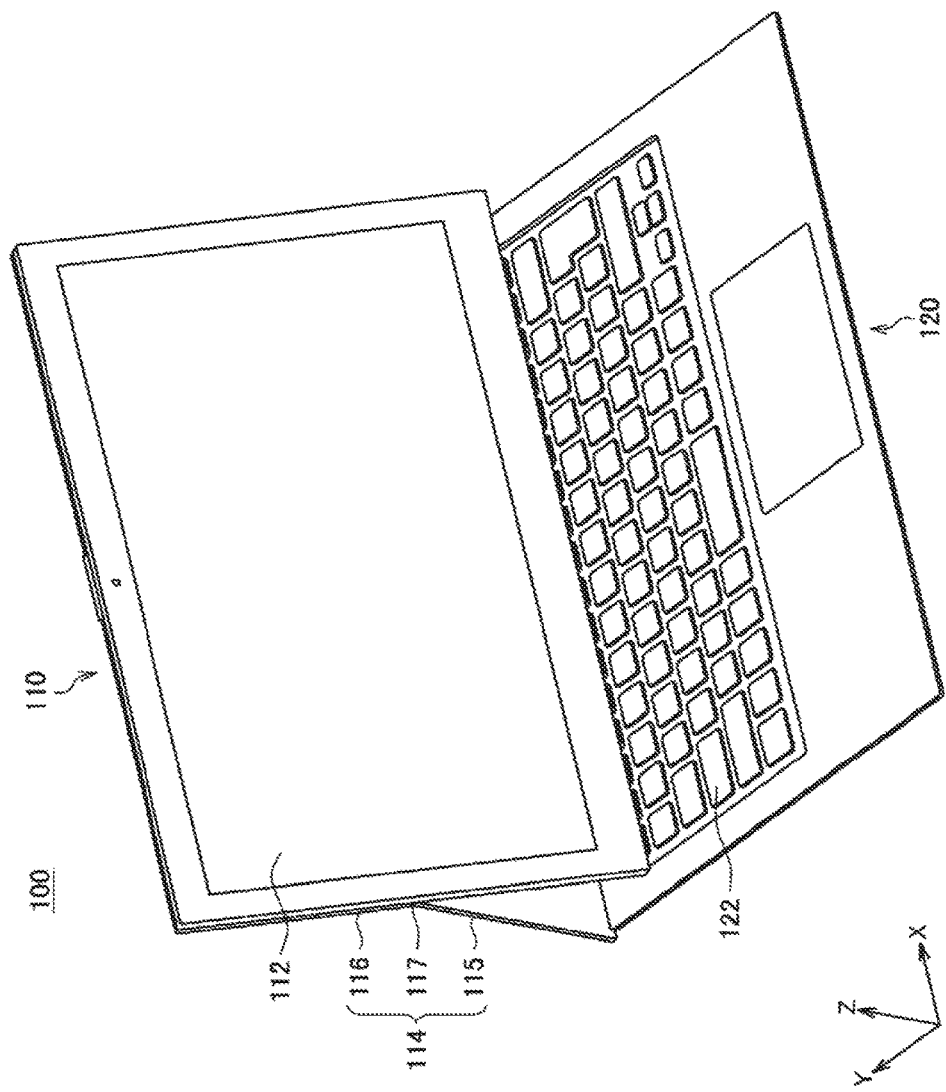
FIG. 5 is a perspective view showing the electronic device when a display unit is rotated using a bent coupling portion.
Figure 6:
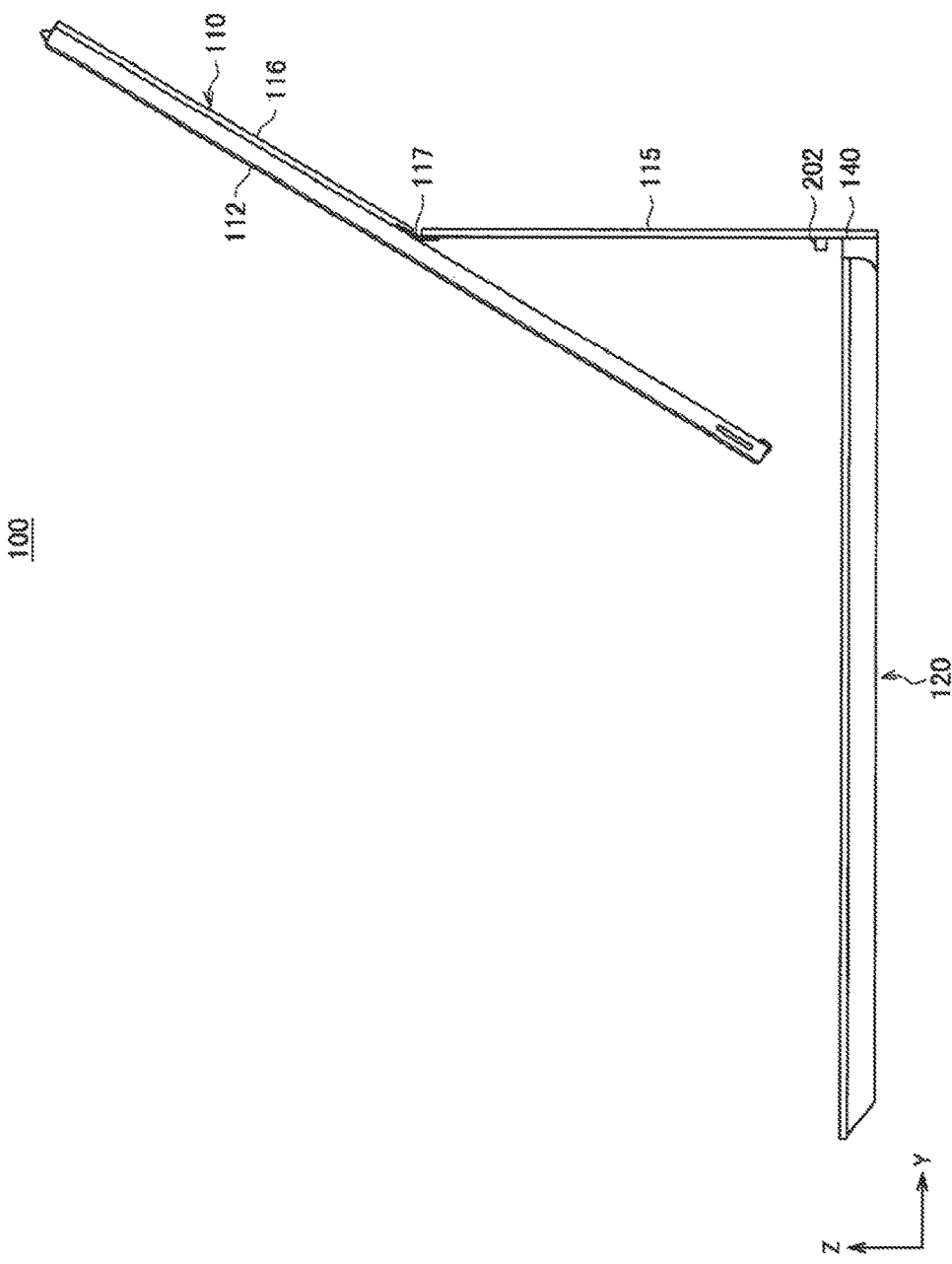
FIG. 6 is a side view of the electronic device shown in FIG. 5.
Figure 7:
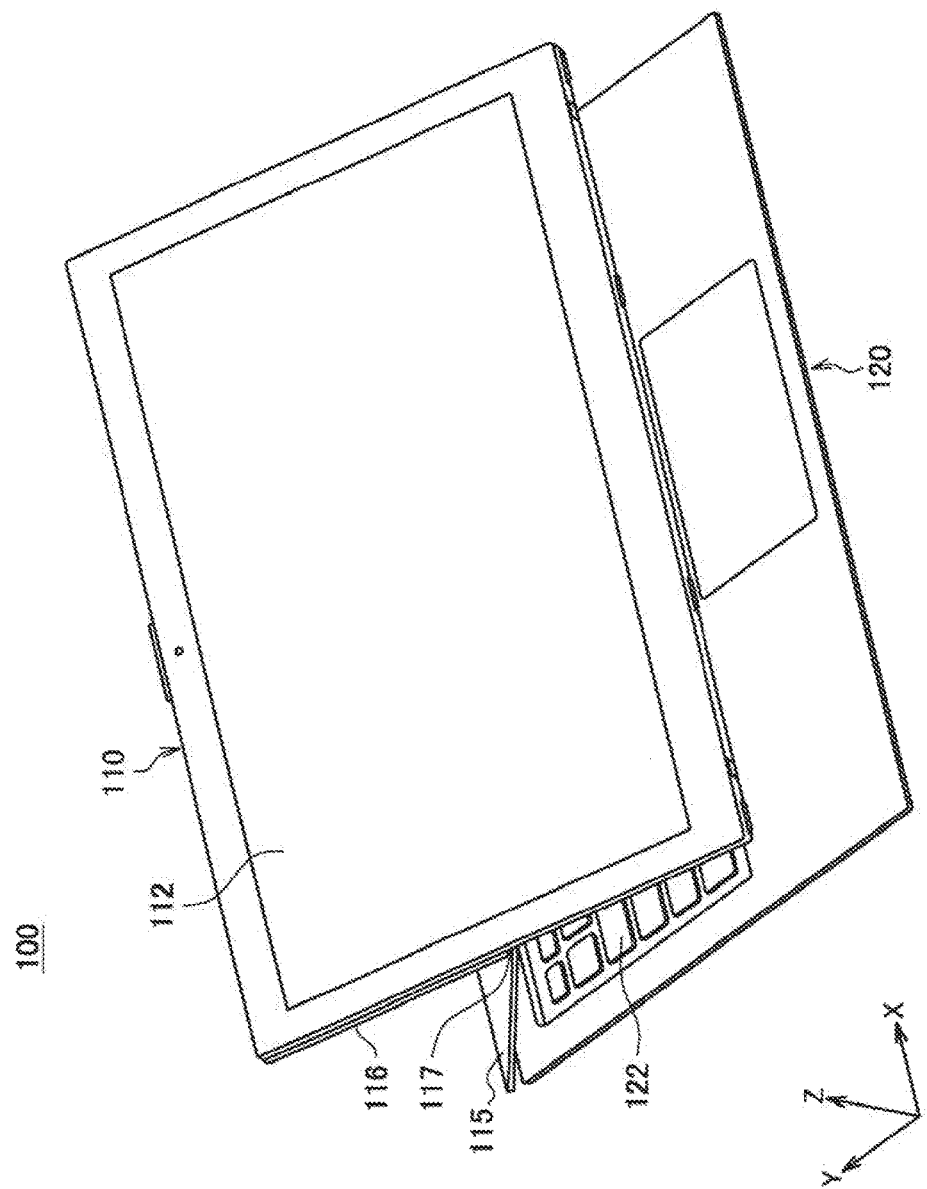
FIG. 7 is a perspective view showing the electronic device when a display-side case body is rotated using a hinge mechanism.
Figure 8:
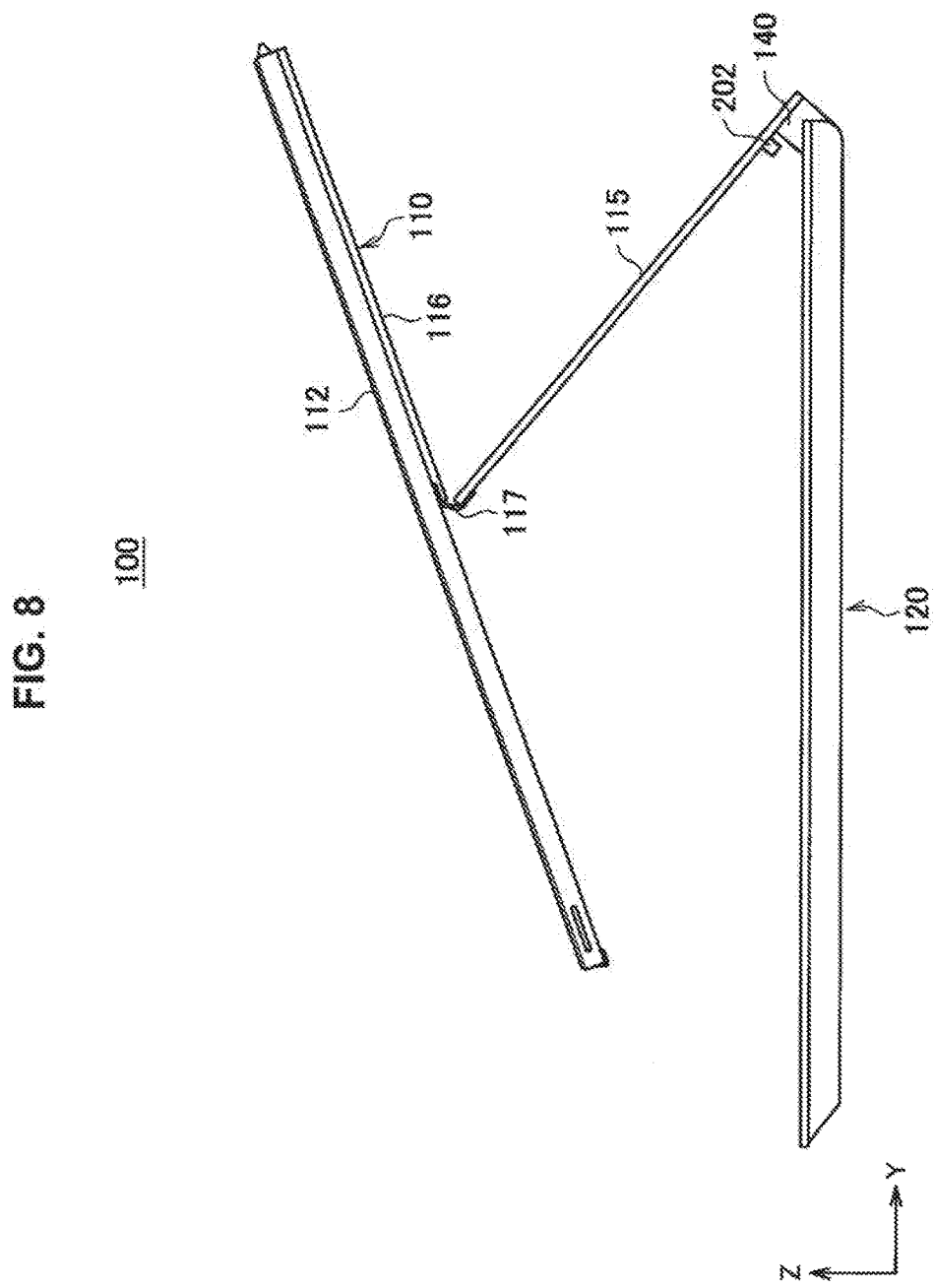
FIG. 8 is a side view of the electronic device shown in FIG. 7.
Figure 9:
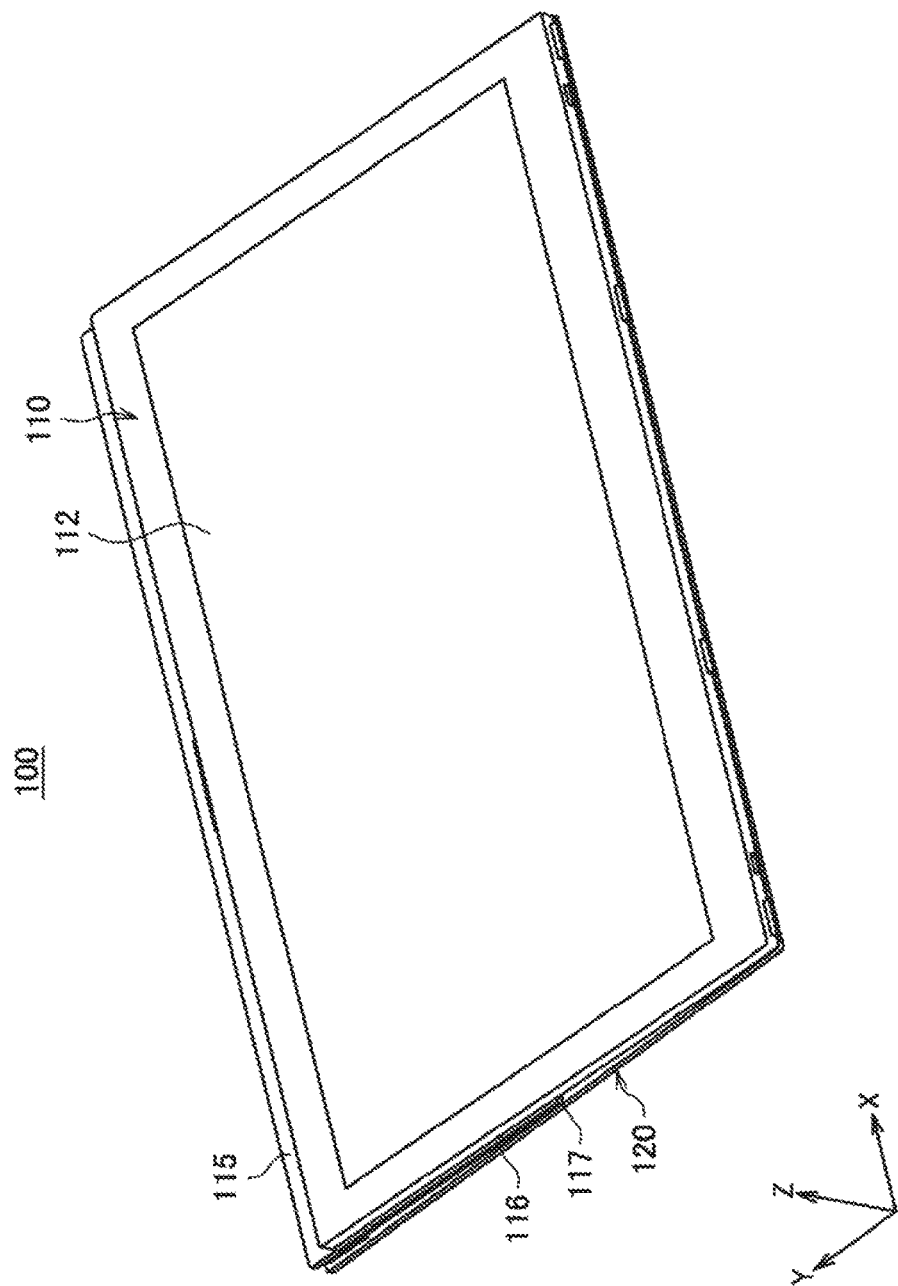
FIG. 9 is a perspective view showing the electronic device in a "tablet" state.
Figure 10:
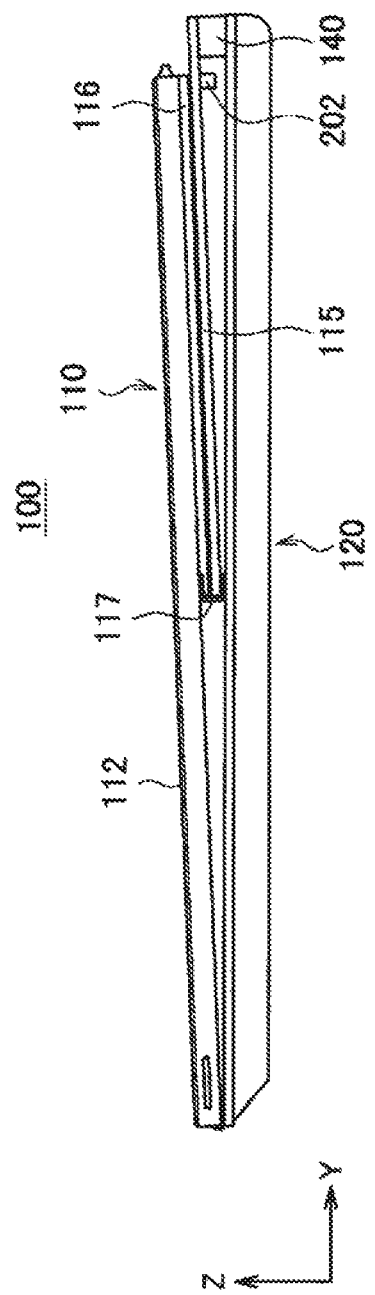
FIG. 10 is a side view of the electronic device in the "tablet" state shown in FIG. 9.

FIG. 5 is a perspective view showing the electronic device 100 when the display unit 112 is rotated using the bent coupling portion 117. FIG. 6 is a side view of the electronic device 100 shown in FIG. 5. FIG. 7 is a perspective view showing the electronic device 100 when the display-side case body 110 is rotated using the hinge mechanism (the "flipped" state). FIG. 8 is a side view of the electronic device 100 shown in FIG. 7. FIG. 9 is a perspective view showing the electronic device 100 in the "tablet" state. FIG. 10 is a side view of the electronic device 100 in the "tablet" state shown in FIG. 9.

(Flipped State)

When the electronic device 100 is in the "clamshell" state shown in FIG. 1, as shown in FIGS. 5 and 6, the display unit 112 is away from the first supporting portion 115 if the second supporting portion 116 and the display unit 112 are rotated with respect to the first supporting portion 115 according to a manipulation of the user. In the present specification, a state in which the display unit 112 is away from the first supporting portion 115 occurring between the "clamshell" state and the "tablet" state as described above is referred to as a "flipped" state.

The second supporting portion 116 and the display unit 112 are rotated with respect to the first supporting portion 115 from the "flipped" state shown in FIGS. 5 and 6 and the first supporting portion 115 is rotated with respect to the main-body-side case body 120 so that an inclination of the display unit 112 approaches the horizontal direction as shown in FIGS. 7 and 8. Claws 202 exposed from the supporting portion 115 are shown in FIGS. 6 and 8. The claws 202 constitute a portion of the locking mechanism described in the following "4. Configuration of locking mechanism."

(Tablet State)

In addition, if the second supporting portion 116 and the display unit 112 are rotated with respect to the first supporting portion 115 and the first supporting portion 115 is rotated with respect to the main-body-side case body 120 from the state shown in FIGS. 7 and 8, as shown in FIGS. 9 and 10, the display unit 112 is in a state in which the display unit 112 is inverted about 180° (a state in which the display unit 112 is rotated to a second position with respect to the first supporting portion 115) as compared to the closed state shown in FIG. 3 (a state in which the display unit 112 is locked into a first position with respect to the first supporting portion 115). In the present specification, a state in which the display unit 112 is closed with respect to the main-body-side case body 120 outward as described above is referred to as a "tablet" state.

In the "tablet" state, as shown in FIG. 10, while an end of the display unit 112 at a front direction side is supported by the main-body-side case body 120, an end of the display unit 112 at a depth direction side is supported on an overlapping portion of the first supporting portion 115 and the second supporting portion 116. As a result, since a position of the end of the display unit 112 at the depth direction side is higher than a position of the end thereof at the front direction side, the display unit 112 is supported in a state in which the display unit 112 is inclined with respect to the main-body-side case body 120. With such a configuration, when the user puts the electronic device 100 down and uses it, since the user can view the display unit 112 in a state closer to a directly facing view, visibility of the display unit 112 can be improved.

Note that, although the state transition from the "clamshell" state to the "tablet" state has been described above, the state transition from the "tablet" state to the "clamshell" state is realized by reversing the movement with respect to the above description. Thus, detailed description is omitted.

3. ARRANGEMENT OF MAGNETS

As described above, the electronic device 100 related to the embodiment can attain the plurality of structure states including the "clamshell" and "tablet" states. However, a change in the structure states of the electronic device 100 which the user does not intend is not desirable for the user. For this reason, a plurality of magnets are arranged in the electronic device 100 related to the embodiment as a member by which the holding of the structure states is supported. A specific example of arrangement of the magnets serving as a holding member of the structure states will be described below with reference to FIG. 11.

Figure 11:
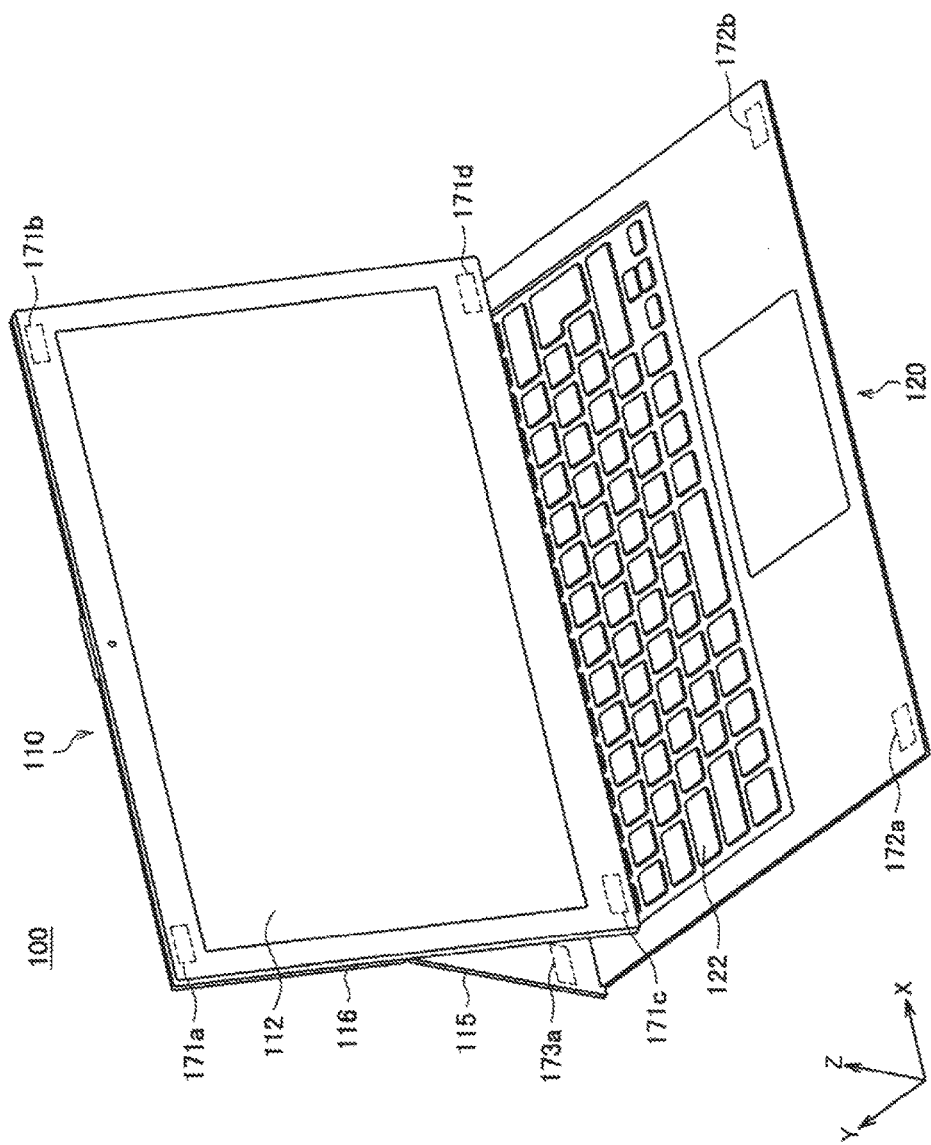
FIG. 11 is an illustrative diagram for describing a specific example of a magnet arrangement.

FIG. 11 is an illustrative diagram for describing the specific example of the magnet arrangement. As shown in FIG. 11, the display-side case body 110 has magnets 171a, 171b, 171c, and 171d which are built in the four corners of the case body. Also, the main-body-side case body 120 has magnets 172a and 172b which are built in both corners at a front side in the depth direction (the Y direction). The first supporting portion 115 of the supporting plate 114 has a magnet 173a and a magnet 173b (not shown) which are built in both corners in the case body width direction (the X direction) at the projecting portion 140 side.

In the closed state of the display-side case body 110, a position of the magnet 172a corresponds to a position of the magnet 171a, a position of the magnet 172b corresponds to a position of the magnet 171b, a position of the magnet 173a corresponds to a position of the magnet 171c, and a position of the magnet 173b corresponds to a position of the magnet 171d. For this reason, in the closed state of the display-side case body 110, attraction acts between the magnet 171a and the magnet 172a, between the magnet 171b and the magnet 172b, between the magnet 171c and the magnet 173a, and between the magnet 171d and the magnet 173b, thereby easily holding the closed state of the display-side case body 110.

In the "tablet" state, the position of the magnet 173a corresponds to the position of the magnet 171a, the position of the magnet 173b corresponds to the position of the magnet 171b, the position of the magnet 172a corresponds to the position of the magnet 171c, and the position of the magnet 172b corresponds to the position of the magnet 171d. For this reason, in the "tablet" state, attraction acts between the magnet 171a and the magnet 173a, between the magnet 171b and the magnet 173b, between the magnet 171c and the magnet 172a, and between the magnet 171d and the magnet 172b, thereby easily holding the "tablet" state.

Also, in the "clamshell" state, the position of the magnet 173a corresponds to the position of the magnet 171c, and the position of the magnet 173b corresponds to the position of the magnet 171d. For this reason, in the "clamshell" state, attraction acts between the magnet 171c and the magnet 173a and between the magnet 171d and the magnet 173b, thereby easily holding the "clamshell" state.

4. CONFIGURATION OF LOCKING MECHANISM

As described above, the electronic device 100 is provided with the plurality of magnets by which the holding of structure states of the electronic device 100 is supported. Here, if a magnetic force of the magnets is further strengthened, a holding force of the structure states of the electronic device 100 is improved and a force corresponding to a manipulation for transitioning a state becomes necessary, thereby reducing operability for the user. For this reason, suppressing the magnetic force of the magnets to an extent that operability for the user is secured is preferable. In this case, it is difficult to hold the structure states of the electronic device 100 only using the magnetic force of the magnets. In particular, while attraction of four sets of magnets acts in the closed state and the "tablet" state, only attraction of two sets of magnets acts in the "clamshell" state. Thus, it is difficult to reliably hold the "clamshell" state only using the magnetic force of the magnets.

The electronic device 100 related to the embodiment includes the locking mechanism by which the display unit (the movable body) 112 is locked to the first supporting portion (the supporting body) 115 in the "clamshell" state. A configuration and action of the locking mechanism will be sequentially described below in detail.

Figure 12:
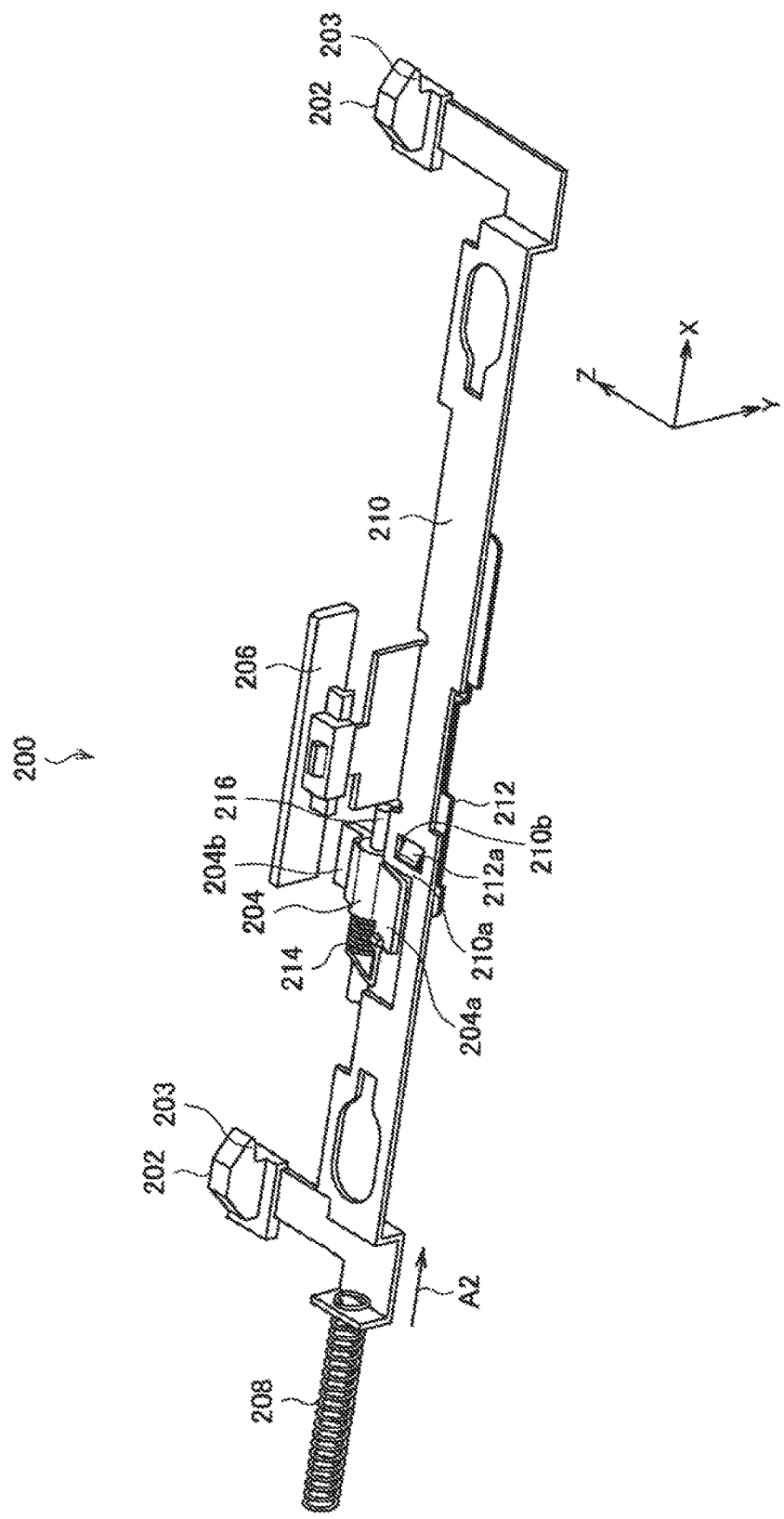
FIG. 12 is a schematic diagram showing a configuration of a locking mechanism according to the embodiment of the present disclosure.
Figure 13:
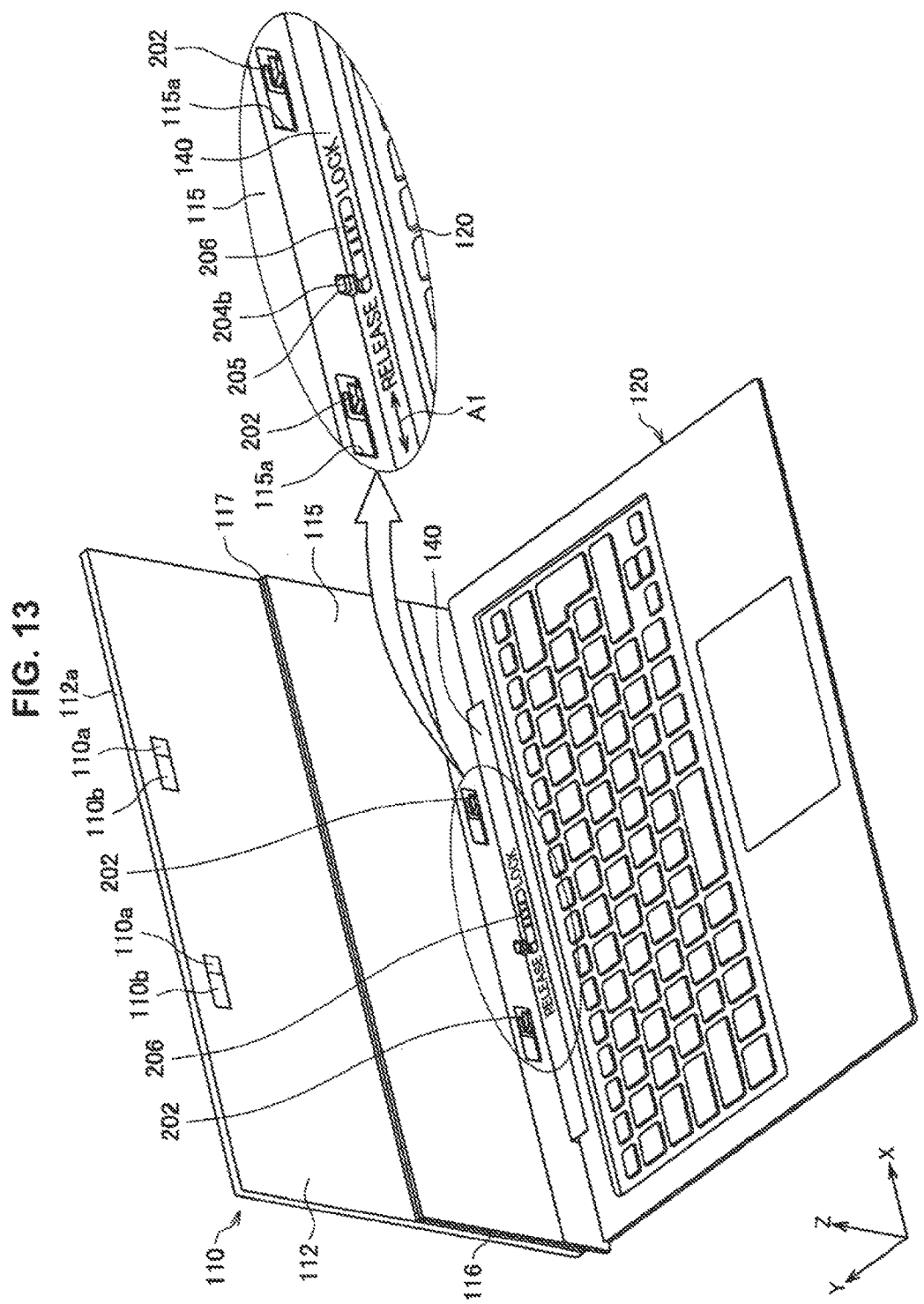
FIG. 13 is a perspective view showing a state in which only the display unit is rotated 180° with respect to a first supporting portion from a "clamshell" state.
Figure 14:
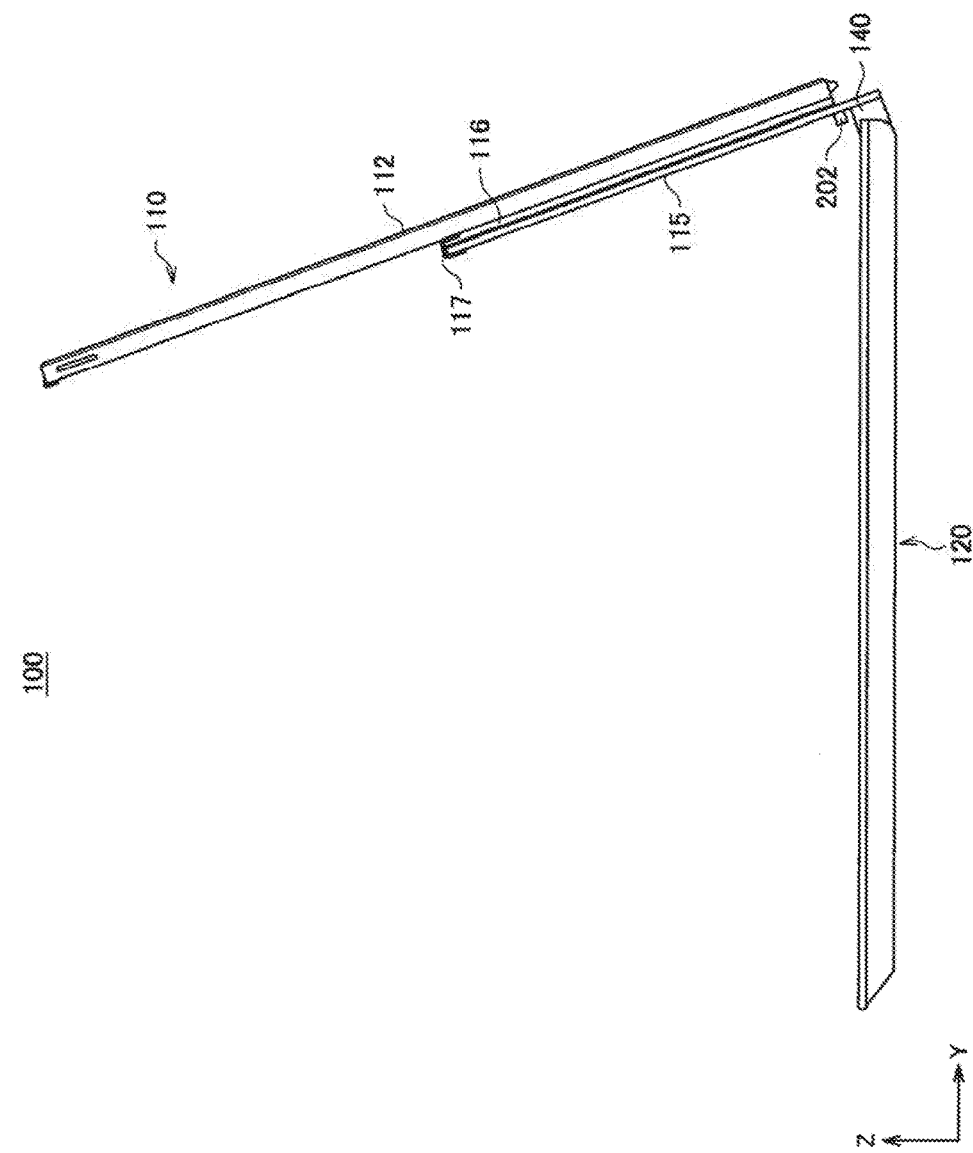
FIG. 14 is a side view of a state of the electronic device shown in FIG. 13.

FIG. 12 is a schematic diagram showing the entire configuration of a locking mechanism 200 related to the embodiment. FIG. 13 is a perspective view showing a state in which only the display unit 112 is rotated 180° with respect to a first supporting portion 115 from the "clamshell" state. FIG. 14 is a side view of the state of the electronic device 100 shown in FIG. 13. The locking mechanism 200 shown in FIG. 12 is mainly disposed inside the projecting portion 140 shown in FIG. 13 and on the end of the first supporting portion 115 at the projecting portion 140 side. For this reason, the locking mechanism 200 is rotated along with the first supporting portion 115 and the projecting portion 140. Note that, in the state shown in FIG. 13, the user can show the display unit 112 to a person who faces the user.

As shown in FIG. 12, the locking mechanism 200 related to the embodiment has a locking member, a manipulating member, and a holding member. The locking member has two claws 202. Also, the manipulating member has the lever 206 and a lever sheet metal 210. The holding member includes a lock holding member and a releasing hold member. The lock holding member has a spring (an elastic member) 208, and the releasing hold member has a pedal 204, a leaf spring (an engaging member) 212, a torsion coil spring (an elastic member) 214, and a rotary shaft 216.

<4.1. Configuration of Locking Member>

A configuration of the locking member will be first described. The claws 202 serving as an example of the locking member have a function of locking the movable body (the display unit 112) to fix the movable body (the display unit 112) to the supporting body (the first supporting portion 115). The claws 202 are hook type locking claws and have protruding portions 203 protruding in a direction (the X direction) in which the spring 208 biases the lever sheet metal 210. The two claws 202 are fixed to both ends of the lever sheet metal 210, and the two claws 202 can thus slide along with the lever 206 and the lever sheet metal 210 which are included in the manipulating member in the X direction (an A1 direction in FIG. 13).

As shown in FIG. 13, the claws 202 are disposed on the end of the first supporting portion 115 at the projecting portion 140 side and are exposed from an opening portion 115a formed on the end. Also, as shown in FIG. 13, locked portions 110a and claw accommodating spaces 110b are formed at positions of a rear surface of the display unit 112 which correspond to the claws 202 in the "clamshell" state. The claw accommodating spaces 110b are spaces formed to be recessed in the rear surface of the display unit 112, and the locked portions 110a are a hook type member which blocks a portion of openings of the claw accommodating spaces 110b. For this reason, in the "clamshell" state, the claws 202 are accommodated in the claw accommodating spaces 110b and the protruding portions 203 of the claws 202 are engaged with the locked portions 110a so that the display unit 112 is locked into the first supporting portion 115 and the "clamshell" state can be thus locked. Note that, in the present specification, a position at which the claws 202 are engaged with the locked portions 110a is referred to as a locking position, and a position at which the claws 202 are not engaged with the locked portions 110a is referred to as a releasing position in some cases. The claws 202 are moved between the locking position and the releasing position based on the manipulation of the lever 206 by the user, or the like.

<4.2. Configuration of Manipulating Member>

Next, a configuration of the manipulating member will be described. As shown in FIG. 12, the manipulating member has the lever 206 which is manipulated by the user using his or her finger, or the like and the lever sheet metal 210 connected to the lever 206 and extending in the case body width direction (the X direction). As shown in FIG. 13, the lever 206 is exposed from the projecting portion 140. For this reason, the user manipulates the lever 206 to slide in the width direction (the X direction) of the electronic device 100 so that, for example, the lever 206 can be moved from the locking position to the releasing position. Here, as shown in FIG. 13, since the lever 206 and the claws 202 are fixed to the same lever sheet metal 210, the claws 202 are also moved in the A1 direction corresponding to the width direction (the X direction) of the electronic device 100 in cooperation with movement of the lever 206.

<4.3. Configuration of Lock Holding Member>

Next, a configuration of the lock holding member among the holding members will be described. The lock holding member has a function of holding the manipulating member (the lever 206, or the like) and the locking member (the claws 202) at the locking position. As shown in FIG. 12, the lock holding member is configured as the spring 208 provided on an end in the X direction of the locking mechanism 200. The spring 208 is configured with a compression coil spring. As shown in FIG. 12, the spring 208 is connected to, for example, one end of the lever sheet metal 210 and biases the lever sheet metal 210 in an arrow A2 direction in FIG. 12, that is, the other direction of the lever sheet metal 210. The lever 206 and the claws 202 can be held at the locking position by biasing the lever sheet metal 210 using the spring 208.

Note that the arrangement of the spring 208 is not limited to the example shown in FIG. 12, but for example, the spring 208 may be provided on the other end of the lever sheet metal 210. Also, a tension spring can also be used as the lock holding member instead of the spring 208 formed by the compression spring.

<4.4. Configuration of Releasing Hold Member>

Next, a configuration of the releasing hold member among the holding members will be described. The releasing hold member has a function of holding the manipulating member (the lever 206, or the like) and the locking member (the claws 202) at the releasing position and a function of releasing the function of holding the members at the releasing position in accordance with a position of the movable portion (the display unit 112) with respect to the supporting body (the first supporting portion 115). The releasing hold member includes the engaging member (the leaf spring 212, or the like) and a disengaging member (the pedal 204, the torsion coil spring 214, the rotary shaft 216, etc.).

<4.4.1. Configuration of Engaging Member>

The leaf spring 212 serving as an engaging member will be first described. The leaf spring 212 is an example of the engaging member which is engaged with the manipulating member and holds the manipulating member at the releasing position by being engaged with the lever sheet metal 210 of the manipulating member when the lever 206 serving as a manipulating member is at the releasing position. The leaf spring 212 along the lower side of the lever sheet metal 210 extends in the width direction (the X direction) of the electronic device 100.

Figure 15:
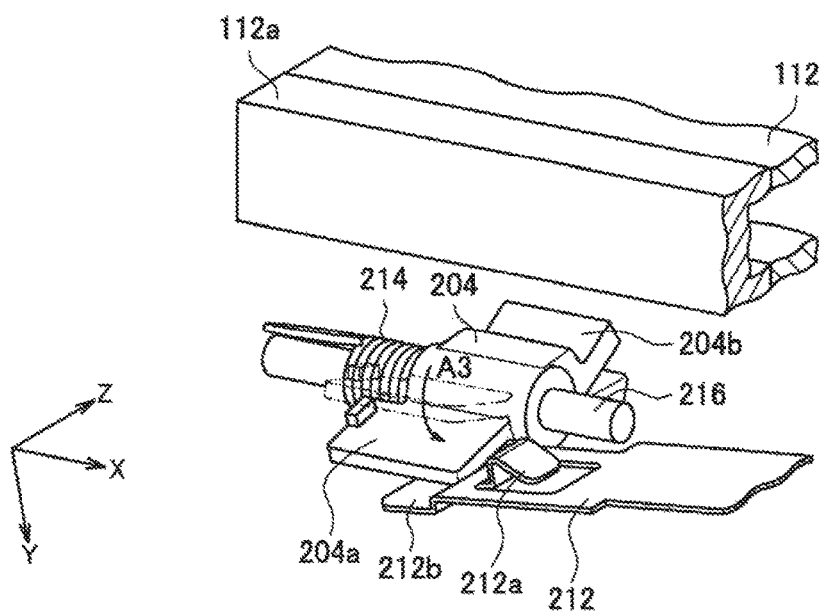
FIG. 15 is an illustrative diagram for describing a configuration in the vicinity of a pedal.
Figure 16:
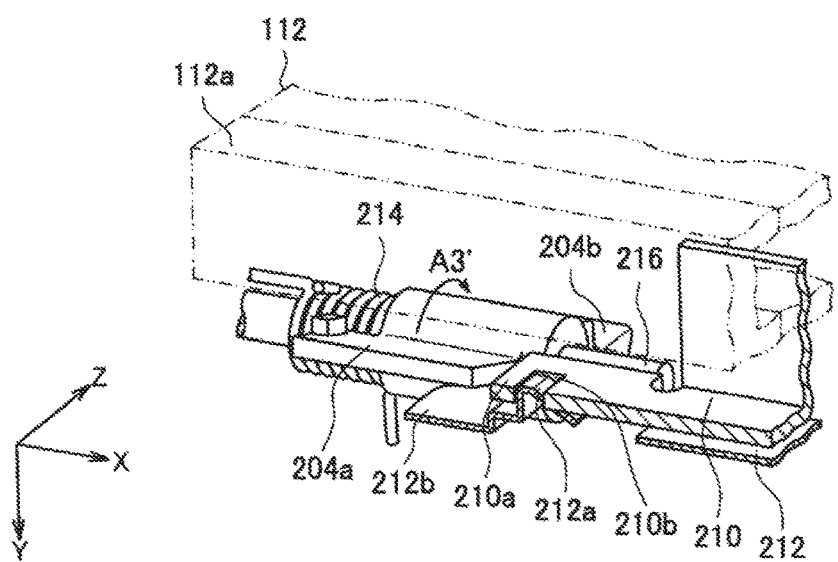
FIG. 16 is an illustrative diagram for describing a configuration in the vicinity of a leaf spring.

Here, a configuration of the lever sheet metal 210 and the leaf spring 212 will be described in greater detail with reference to FIGS. 12, 15, and 16. FIGS. 15 and 16 are illustrative diagrams for describing a configuration in the vicinity of the pedal 204 and an end of the leaf spring 212. FIG. 15 shows a state in which a function of holding the manipulating member at the releasing position using the leaf spring 212 is released by the pedal 204, and FIG. 16 shows a state in which the manipulating member is held at the releasing position using the leaf spring 212.

As shown in FIGS. 12, 15, and 16, the leaf spring 212 has a claw 212a which protrudes toward the lever sheet metal 210 and a contact portion 212b which comes into contact with a blade portion 204a of the pedal 204 which will be described below. The leaf spring 212 is a cantilever spring in which an end of the contact portion 212b side is a free end, and the other end is a fixed end. The fixed end of the leaf spring 212 is fixed to a supporting member different from the lever sheet metal 210. The lever sheet metal 210 has a through-hole 201b through which the claw 212a of the leaf spring 212 can be fitted and has an engaging portion 210a which is engaged with the claw 212a of the leaf spring 212 on an edge of the through-hole 210b at the pedal 204 side.

When the user moves the lever 206 in the X direction (the arrow A1 direction) between the locking position and the releasing position, the lever sheet metal 210 is provided such that the lever sheet metal 210 can be moved in the X direction along with the lever 206, but the leaf spring 212 is fixed and is not moved in the X direction along with the lever 206. Therefore, the lever sheet metal 210 and the leaf spring 212 are relatively moved in the X direction according to a manipulation of the lever 206 by the user.

As shown in FIG. 16, when the lever 206 and the claws 202 are moved from the locking position to the releasing position, the claw 212a of the leaf spring 212 is engaged with the engaging portion 210a of the lever sheet metal 210. For this reason, the lever sheet metal 210 can be relatively moved in the X direction with respect to the leaf spring 212. Therefore, the lever sheet metal 210 can be fixed to the releasing position by engaging the leaf spring 212 with the lever sheet metal 210. As a result, the lever 206 and the claws 202 which are fixed to the lever sheet metal 210 can be held at the releasing position. As described above, the leaf spring 212 serves as an engaging member of a releasing hold member by which the lever 206 and the claws 202 are held at the releasing position.

<4.4.2. Configuration of Disengaging Member>

Next, a configuration of the disengaging member will be described. The disengaging member has a function of disengaging engagement between the engaging member (the leaf spring 212) and the manipulating member (the lever 206 and the lever sheet metal 210) in accordance with a position of the movable body (the display unit 112) with respect to the supporting body (the first supporting portion 115). The disengaging member is configured with the pedal 204, the torsion coil spring 214, the rotary shaft 216, etc. which are shown in FIG. 12.

The pedal 204 is a member which can be rotated about the rotary shaft 216 extending in the X direction and is disposed near the leaf spring 212 and the lever sheet metal 210. A configuration of the pedal 204 will be described below in greater detail with reference to FIGS. 15 and 16 as well.

As shown in FIGS. 15 and 16, the pedal 204 has the blade portion 204a formed to protrude in a direction perpendicular to the rotary shaft 216 and the blade-shaped contact portion 204b formed to protrude in a direction opposite to the blade portion 204a. As shown in FIG. 13, the contact portion 204b of the pedal 204 is exposed from a guide groove 205 formed on the boundary between the first supporting portion 115 and the projecting portion 140. As described above, the contact portion 204b of the pedal 204 is exposed from the guide groove 205 and is disposed at a position at which the contact portion 204b can come into contact with an outer frame 112a of the display unit 112 in the "clamshell" state. On the other hand, the blade portion 204a of the pedal 204 is disposed at a position at which the blade portion 204a can come into contact with the contact portion 212b of an end of the leaf spring 212.

Also, the torsion coil spring 214 is inserted into the rotary shaft 216 of the pedal 204. The torsion coil spring 214 biases the pedal 204 about the rotary shaft 216 in a direction in which the pedal 204 is rotated in an arrow A3 direction shown in FIG. 15, that is, a direction in which the contact portion 204b of the pedal 204 is rotated in a depth direction deep side (a Y positive direction) of the electronic device 100.

The pedal 204 with such a configuration is rotated between an allowable position and a disengaging position about the rotary shaft 216 due to contact of the outer frame 112a of the display unit 112 with the contact portion 204b and a biasing force of torsion coil spring 214. Here, as shown in FIG. 16, the allowable position of the pedal 204 is a position at which the pedal 204 allows the engaging member (the leaf spring 212) to be engaged with the manipulating member (the lever sheet metal 210). On the other hand, as shown in FIG. 15, the disengaging position of the pedal 204 is a position at which the pedal 204 allows the engaging member (the leaf spring 212) to be disengaged from engagement with the manipulating member (the lever sheet metal 210). The allowable position and the disengaging position of the pedal 204 will be described below in detail.

FIG. 16 shows a state in which the pedal 204 is at the allowable position. As shown in FIG. 16, when the electronic device 100 is in the "clamshell" state, the outer frame 112a of the display unit 112 comes into contact with the contact portion 204b of the pedal 204 so that the contact portion 204b is pressed into the guide groove 205 (refer to FIG. 13). For this reason, the pedal 204 is rotated in an arrow A3' direction against the biasing force of the torsion coil spring 214 and is positioned at the allowable position. The blade portion 204a of the pedal 204 is away from the leaf spring 212 and they do not come into contact with each other at this allowable position, and the pressing of the leaf spring 212 by the blade portion 204a is thus released. Therefore, as shown in FIG. 16, the claw 212a of the leaf spring 212 is engaged with the engaging portion 210a of the lever sheet metal 210 so that the lever sheet metal 210 is held at the releasing position by the leaf spring 212. As described above, the pedal 204 allows the leaf spring 212 to be engaged with the lever sheet metal 210 at the allowable position.

On the other hand, FIG. 15 shows a state in which the pedal 204 is at the disengaging position. When the electronic device 100 is changed from the "clamshell" state to the "flipped" state, and the outer frame 112a of the display unit 112 is away from the contact portion 204b, as shown in FIG. 15, the pedal 204 is rotated in the A3 direction by the biasing force of the torsion coil spring 214 and is positioned at the disengaging position. The pedal 204 at the disengaging position causes the leaf spring 212 to be disengaged from the engagement with the lever sheet metal 210 when the leaf spring 212 is pressed by the blade portion 204a.

To be more specific, when the outer frame 112a of the display unit 112 does not come into contact with the contact portion 204b of the pedal 204, the pedal 204 is freely rotated. As a result, as shown in FIG. 15, the pedal 204 is biased by the torsion coil spring 214 in a direction in which the pedal 204 is rotated in the arrow A3 direction, and the leaf spring 212 is pressed by the blade portion 204a. Thus, bending deformation occurs in the leaf spring 212, and the engagement between the claw 212a of the leaf spring 212 and the engaging portion 210a of the lever sheet metal 210 is disengaged.

As described above, the pedal 204 at the disengaging position causes the leaf spring 212 to be disengaged from the engagement with the lever sheet metal 210 so that the holding of the lever sheet metal 210 at the releasing position is released. Thus, the lever sheet metal 210 from which the engagement with the leaf spring 212 is disengaged is moved by a biasing force of the spring 208 in a biasing direction (the arrow A2 direction in FIG. 12) of the spring 208. As a result, the lever 206 and the claws 202 the lever 206 and the claws 202 which are connected to the lever sheet metal 210 are automatically moved from the releasing position to the locking position.

5. ACTION OF LOCKING MECHANISM

The locking mechanism 200 related to the embodiment has been described above. Next, an overview of the state transition of the electronic device 100 based on the action of the locking mechanism 200 will be described.

<5.1. Overview of Action of Locking Mechanism>

Figure 17:
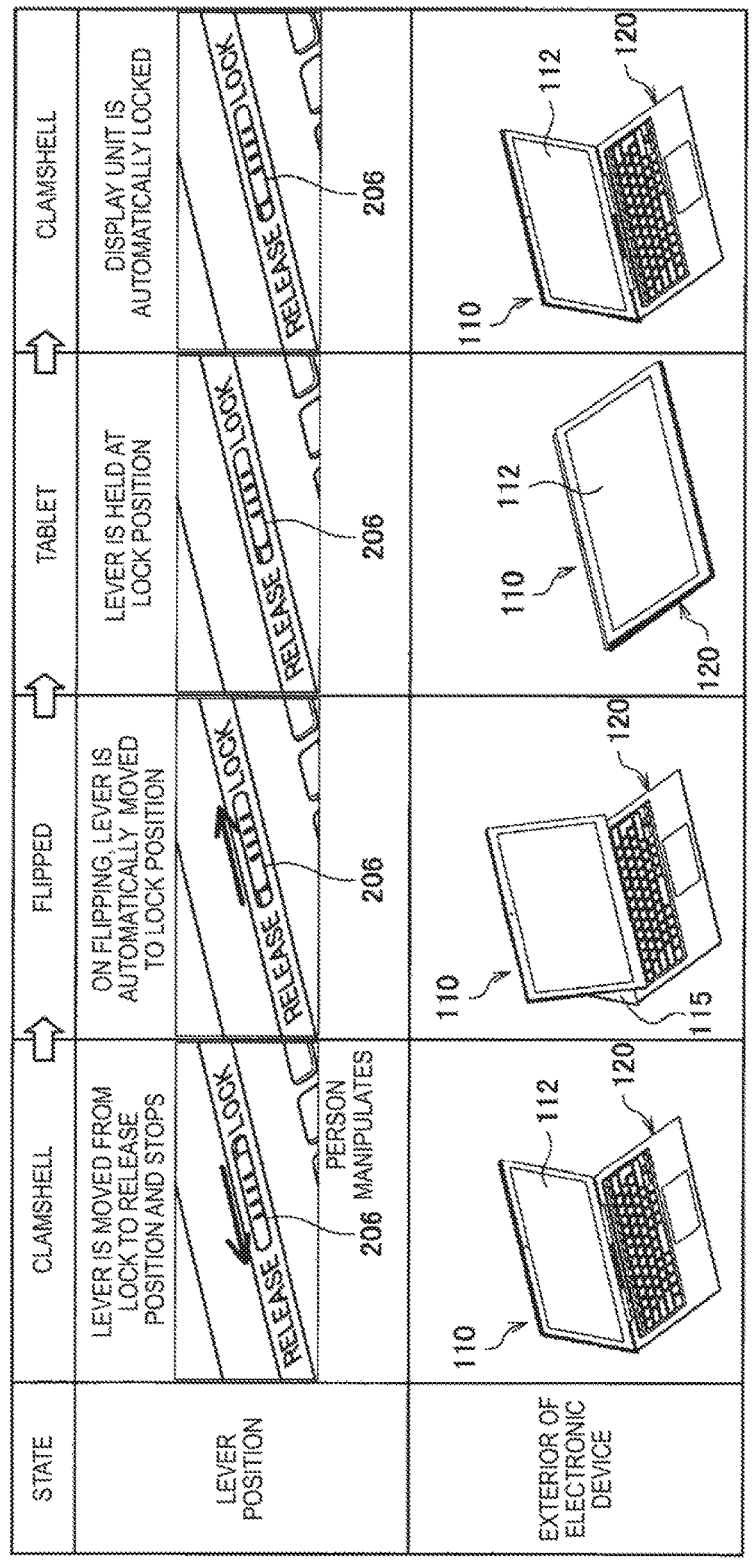
FIG. 17 is an illustrative diagram for describing a manipulating position of a lever and a change in the exterior of the electronic device according to a state transition.

FIG. 17 is an illustrative diagram for describing the manipulating position of the lever 206 and a change in the exterior of the electronic device 100 according to the state transition of the electronic device 100. First, if the electronic device 100 is in the "clamshell" state, and the lever 206 is at the locking position, the display unit 112 is locked into the first supporting portion 115. Here, if the user moves the lever 206 from the locking position to the releasing position, the lever 206 is held at the releasing position even after the user lifts his or her finger from the lever 206. Thus, the locking of the display unit 112 to the first supporting portion 115 is released, and the display unit 112 can be rotated with respect to the first supporting portion 115.

Next, if the electronic device 100 is transitioned from the "clamshell" state to the "flipped" state, that is, if the display unit 112 is rotated with respect to the first supporting portion 115, the lever 206 is moved from the releasing position to the locking position by the biasing force of the spring 208 without a manipulation by the user. Also, the lever 206 is held at the locking position by the biasing force of the spring 208 even after the electronic device 100 is transitioned to the "tablet" state.

After that, if the electronic device 100 is returned from the "tablet" state to the "clamshell" state, the locked portions 110a of the display unit 112 are engaged with the claws 202, the display unit 112 is locked into the first supporting portion 115, and the lever 206 is held at the locking position by the biasing force of the spring 208.

As described above, according to the locking mechanism 200 related to the embodiment, if the user moves the lever 206 from the locking position to the releasing position using his or her finger, the lever 206 is held at the releasing position even after the user lifts his or her finger from the lever 206. Thus, the display unit 112 can be rotated (flipped) with respect to the first supporting portion 115 in a state in which the user has lifted his or her finger from the lever 206.

Therefore, since it is not necessary for the user to support the lever 206 at the releasing position using his or her finger, the display unit 112 does not interfere with the finger when the display unit 112 is flipped, and a flip operation can thus be easily performed.

In general, when a mechanism configured to lock a member using a lever is provided, there is a need for a user to move the lever to a locking position when locking. In addition, there is a need for the user to move the lever to a lock releasing position when releasing locking. For this reason, there is a need for the user to move the lever twice to transition the member to the locked state again after transitioning the member from a locked state to an unlocked state. Also, when the display unit 112 is locked into the first supporting portion 115 using such a mechanism, if the user forgets to lock the display unit in a "clamshell" state, the display unit 112 can unexpectedly rotate with respect to the first supporting portion 115, thereby reducing operability and convenience of the electronic device 100. Also, a magnetic force between the magnet 171c (171d) and the magnet 173a (173b) of the display unit 112 and the first supporting portion 115 can also be increased to prevent rotation of the display unit 112 when the user forgets to lock, but this reduces manufacturing cost and operability of the electronic device 30.

In this regard, according to the locking mechanism 200 related to the embodiment, when the state is transitioned from the "clamshell" state to the "flipped" state, the lever 206 can be automatically moved from the releasing position to the locking position by the biasing force of the spring 208. After the electronic device 100 is returned to the "clamshell" state, the lever 206 is automatically held at the locking position by the biasing force of the spring 208. Therefore, there is no need for the user to manually move the lever 206 to the locking position after the transition to the "clamshell" state. Thus, a state transition from the "clamshell" state to the "tablet" state and a state transition from the "tablet" state to the "clamshell" state can be realized only in a single lever manipulation. Also, since the locking is automatically performed in the "clamshell" state, it is possible to reliably prevent someone from forgetting to lock the lever. Thus, since the magnetic force between the magnet 171c (171d) and the magnet 173a (173b) can be reduced, rotation of the display unit 112 involving separation of the magnet 171c (171d) and the magnet 173a (173b) can be performed at a low load and thus operability for the user can be improved.

<5.2. Details of Action of Locking Mechanism>

An overview of the state transition of the electronic device 100 based on the action of the locking mechanism 200 has been described above. Next, actions of the locking mechanism 200 in the state transitions will be described in detail with reference to FIGS. 18 to 21.

<5.2.1. "Clamshell"+"Locked" State>.

Figure 18A:
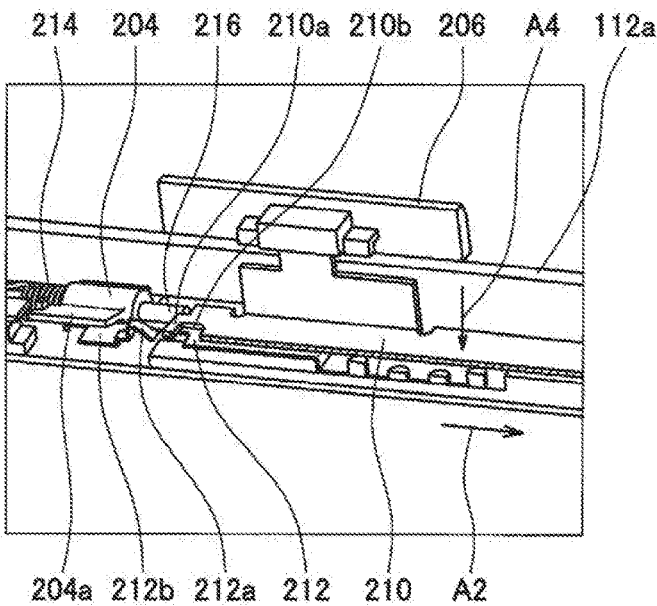
FIG. 18A is a perspective view showing the vicinity of the lever and the pedal in the "clamshell" state.
Figure 18B:
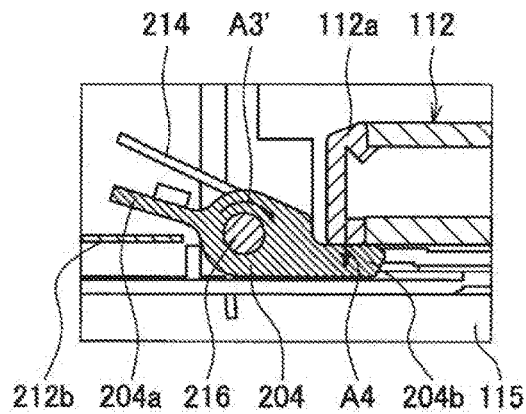
FIG. 18B is a cross-sectional view showing the vicinity of the pedal in the "clamshell" state.
Figure 18C:
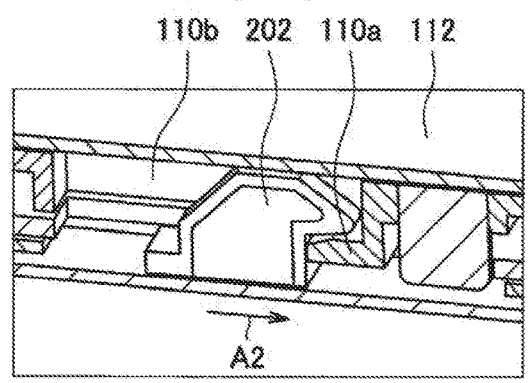
FIG. 18C is a perspective view showing an engagement state between claws and the display unit in the "clamshell" state.

FIG. 18 is a schematic diagram showing a locking mechanism when the display unit 112 is locked in the "clamshell" state and shows a state in which the lever 206 is at the locking position. To be more specific, FIG. 18A shows the vicinity of the lever 206 and the pedal 204, FIG. 18B shows a cross-sectional view along a surface perpendicular to the rotary shaft 216 of the pedal 204, and FIG. 18C shows an engagement state between the claws 202 and the locked portions 110a of the rear surface of the display unit 112.

In the "clamshell" state and the state in which the lever 206 is at the locking position, since the lever sheet metal 210 is biased by the spring 208 in the arrow A2 direction as shown in FIG. 18A, the claws 202 fixed to the lever sheet metal 210 are engaged with the locked portions 110a formed in the rear surface of the display unit 112 as shown in FIG. 18C. Thus, the display unit 112 is locked into the first supporting portion 115.

As shown in FIG. 18B, in the "clamshell" state in which the rear surface of the display unit 112 comes into close contact with the first supporting portion 115, the outer frame 112*a* of the display unit 112 comes into contact with the contact portion 204*b* of the pedal 204, thereby pressing the pedal 204 in an arrow A4 direction, that is, the first supporting portion 115 direction. Thus, the pedal 204 is rotated in the arrow A3' direction against the biasing force of the torsion coil spring 214. The blade portion 204*a* of the pedal 204 is away from the contact portion 212*b* of the leaf spring 212 in a state in which the pedal 204 is rotated in the arrow A3' direction. For this reason, <5.2.2. "Clamshell"+"Unlocked" State>

Figure 19A:
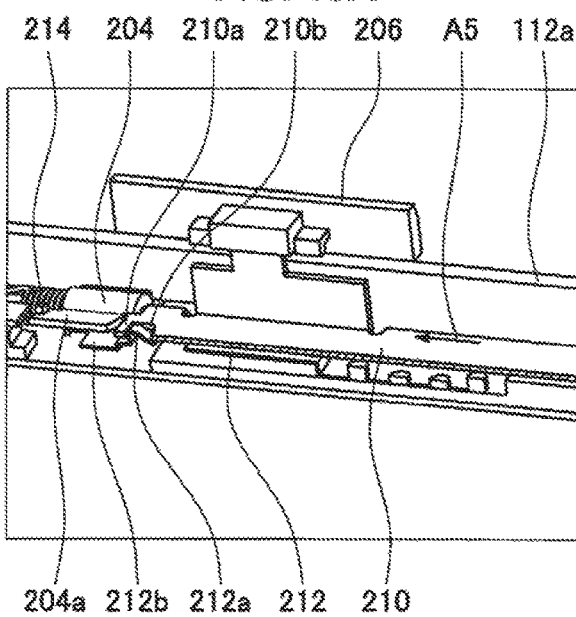
FIG. 19A is a perspective view showing the vicinity of the lever and the pedal in the "clamshell" state.
Figure 19B:
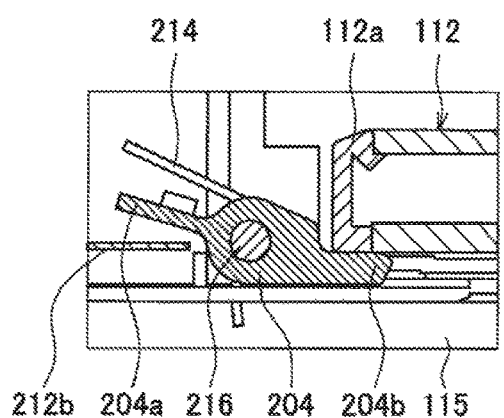
FIG. 19B is a cross-sectional view showing the vicinity of the pedal in the "clamshell" state.
Figure 19C:
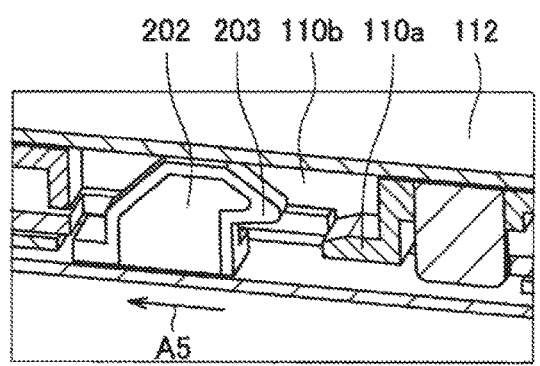
FIG. 19C is a perspective view showing an engagement state between the claws and the display unit in the "clamshell" state.

FIG. 19 is a schematic diagram showing the locking mechanism when the display unit 112 is unlocked in the "clamshell" state and shows a state in which the lever 206 is moved to the releasing position. To be more specific, FIG. 19A shows the vicinity of the lever 206 and the pedal 204, FIG. 19B shows a cross section along the surface perpendicular to the rotary shaft 216 of the pedal 204, and FIG. 19C shows the engagement state between the claws 202 and the locked portions 110*a* of the rear surface of the display unit 112.

As shown in FIG. 19A, if the user manipulates the lever 206 and moves it to the releasing position in the "clamshell" state, the lever sheet metal 210 is moved in an arrow A5 direction, that is, a direction against the biasing direction (the A2 direction) by the spring 208. In the course of this movement, the engaging portion 210*a* of the lever sheet metal 210 comes into contact with an inclined surface of the claw 212*a* of the leaf spring 212, and the lever sheet metal 210 is further moved in the arrow A5 direction so that the claw 212*a* of the leaf spring 212 is pressed, and the engaging portion 210*a* of the lever sheet metal 210 moves over a position of the claw 212*a* of the leaf spring 212. Then, the pressed claw 212*a* of the leaf spring 212 is fitted into the through-hole 210*b* of the lever sheet metal 210 by the biasing force of the leaf spring 212. Thus, an engagement surface (a surface perpendicular to the movement direction A5 of the lever sheet metal 210) of the claw 212*a* comes into contact with the engaging portion 210*a* of the lever sheet metal 210, and the engaging portion 210*a* of the lever sheet metal 210 is engaged with the claw 212*a* of the leaf spring 212. Here, the lever sheet metal 210 is biased by the spring 208 in the arrow A2 direction in FIG. 12, but the engaging portion 210*a* of the lever sheet metal 210 is engaged with the claw 212*a* of the leaf spring 212. Thus, the lever sheet metal 210 is not moved in the A2 direction. Therefore, the lever 206 and the claws 202 which are fixed to the lever sheet metal 210 are held at the releasing position.

Also, as shown in FIG. 19C, if the lever 206 is moved to the releasing position, the claws 202 fixed to the lever sheet metal 210 are moved in the arrow A5 direction, and the claws 202 are disengaged from the locked portions 110*a* of the display unit 112. Thus, the display unit 112 can be rotated with respect to the first supporting portion 115.

<5.2.3. "Flipped" State>

Figure 20A:
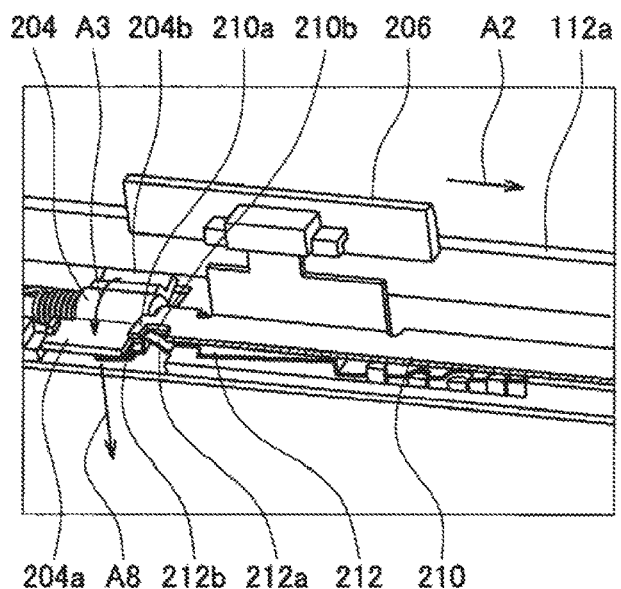
FIG. 20A is a perspective view showing the vicinity of the lever and the pedal in a "flipped" state.
Figure 20B:
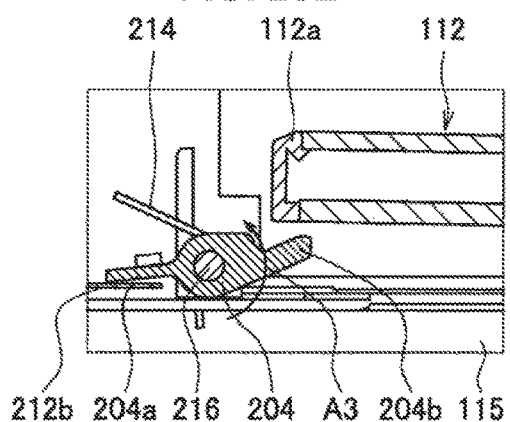
FIG. 20B is a cross-sectional view showing the vicinity of the pedal in the "flipped" state.
Figure 20C:
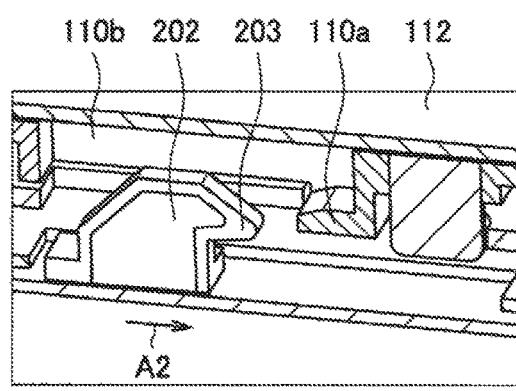
FIG. 20C is a perspective view showing an engagement state between the claws and the display unit in the "flipped" state.

FIG. 20 is a schematic diagram showing the locking mechanism in the "flipped" state. To be more specific, FIG. 20A shows the vicinity of the lever 206 and the pedal 204, FIG. 20B shows a cross section along the surface perpendicular to the rotary shaft 216 of the pedal 204, and FIG. 20C shows the engagement state between the claws 202 and the locked portions 110*a* of the rear surface of the display unit 112.

As described above, if the lever 206 is moved to the releasing position, the display unit 112 can be rotated with respect to the first supporting portion 115, and the display unit 112 can thus be flipped with respect to the first supporting portion 115. As shown in FIG. 20B, if the display unit 112 is rotated with respect to the first supporting portion 115, the outer frame 112*a* of the display unit 112 is away from the contact portion 204*b* of the pedal 204, thereby releasing contact between them. Thus, the pedal 204 is rotated in the arrow A3 direction by the biasing force of the torsion coil spring 214. If the pedal 204 is rotated in the arrow A3 direction, the blade portion 204*a* of the pedal 204 comes into contact with the contact portion 212*b* of the leaf spring 212, the lever sheet metal 210 is bent, the contact portion 212*b* is moved in an arrow A8 direction in FIG. 20A, and a tip side of the leaf spring 212 is bent in a direction in which the tip side is away from the lever sheet metal 210. Thus, the claw 212*a* of the leaf spring 212 is also moved in the arrow A8 direction, and the engaging portion 210*a* of the lever sheet metal 210 is disengaged from the claw 212*a* of the leaf spring 212. Therefore, the lever sheet metal 210 is moved in the arrow A2 direction by the biasing force of the spring 208, and the lever 206 and the claws 202 are automatically moved to the locked position.

Here, if the lever 206 and the claws 202 are moved to the locked position before the claws 202 are released from the claw accommodating spaces 110*b* of the rear surface of the display unit 112, the claws 202 are engaged with the locked portions 110*a* of the display unit 112 again, and the state of the electronic device 100 may thus be returned to the "clamshell" state before flipping is completed. For this reason, a timing at which the lever 206 and the claws 202 are moved to the locking position, that is, a timing at which the engaging portion 210*a* of the lever sheet metal 210 is disengaged from the claw 212*a* of the leaf spring 212 may be a timing at which the claws 202 are released from the claw accommodating spaces 110*b*. At least one among heights of the claws 202, a height of the claw 212*a*, bent characteristics of the leaf spring 212, a length from the contact portion 212*b* to the claw 212*a*, a length from the contact portion 204*b* to the rotary shaft 216, a length from a contact position between the blade portion 204*a* and the contact portion 212*b* to the rotary shaft 216, and an interval between the blade portion 204*a* and the contact portion 212*b* in the "clamshell" state is adjusted to realize such a timing.

<5.2.4. State Transition from "Flipped" State to "Clamshell" State>

Figure 21A:
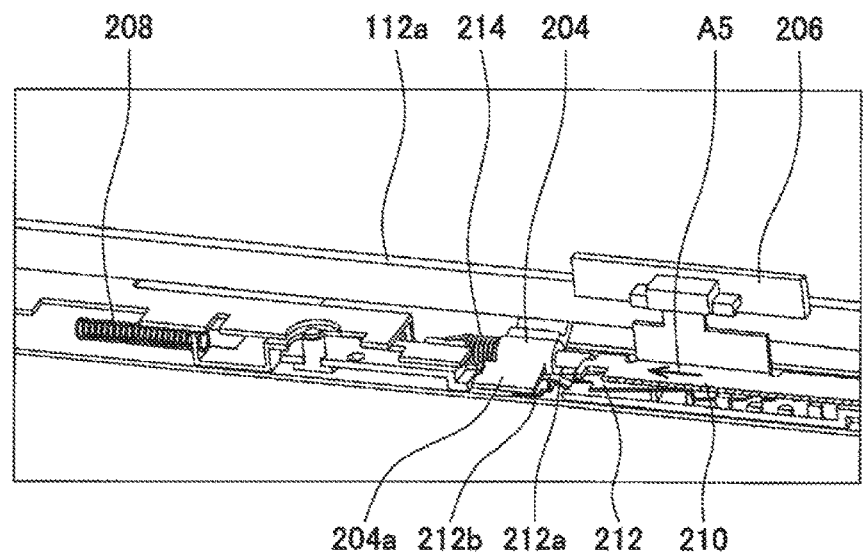
FIG. 21A is a perspective view showing a locking mechanism when a state is transitioned from the "tablet" state to the "clamshell" state.
Figure 21B:
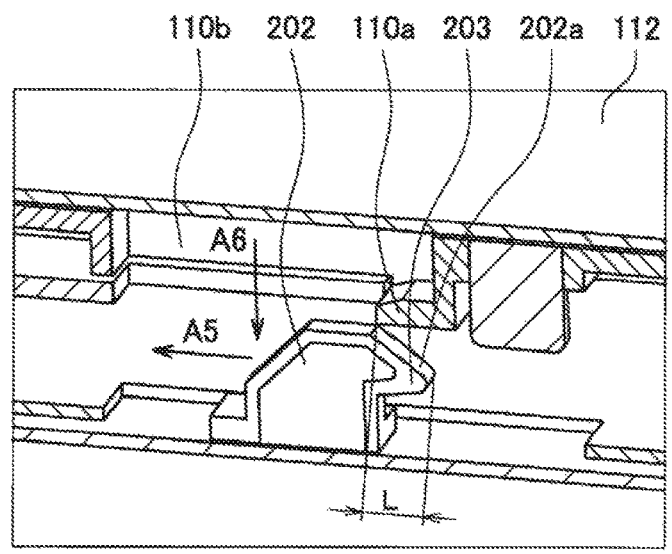
FIG. 21B is a perspective view showing an engagement state between the claws and the display unit when a state is transitioned from the "tablet" state to the "flipped" state.

FIG. 21 shows the locking mechanism when a state is transitioned from the "tablet" state to the "clamshell" state via the "flipped" state. To be more specific, FIG. 21A shows the vicinity of the lever 206, the pedal 204, and the spring 208, and FIG. 21B shows engagement states between the claws 202 and the locked portions 110*a* of the rear surface of the display unit 112.

When the state is transitioned from the "flipped" state to the "clamshell" state, immediately before the pedal 204 comes into contact with the outer frame 112*a* of the display unit 112, as shown in FIG. 21A, the blade portion 204*a* of the pedal 204 presses the contact portion 212*b* of the leaf spring 212 by the biasing force of the coil spring 214, and the lever sheet metal 210 is held at the locking position by the biasing force of the spring 208.

On the other hand, as shown in FIG. 21B, the display unit 112 is moved in an arrow A6 direction, that is, a direction in which the display unit 112 approaches the claws 202, and the locked portions 110a of the display unit 112 come into contact with inclined surfaces 202a of the claws 202 at the locking position in the vicinity of the claws 202. The inclined surfaces 202a of the claws 202 are inclined at a predetermined angle with respect to a movable direction (the arrow A2 direction and A5 direction) of the claws 202. Also, if the locked portions 110a are further moved in the arrow A6 direction, the inclined surfaces 202a of the claws 202 are pressed downward (the arrow A6 direction) due to contact with the locked portions 110a. For this reason, the claws 202 are moved in the arrow A5 direction because the claws 202 receive a pressing force in the arrow A5 direction from the locked portions 110a. Movement lengths L of the claws 202 in the arrow A5 direction at this time correspond to horizontal lengths from contact start positions of the locked portions 110a with respect to the inclined surfaces 202a to tips of the protruding portions 203 of the claws 202. Also, if the locked portions 110a are moved in the arrow A6 direction until they move over a position of the inclined surfaces 202a, as shown in FIG. 18C, the claws 202 are moved in the A2 direction by the biasing force of the spring 208 and are returned to the locking position, and the claws 202 are thus engaged with the locked portions 110a. Therefore, the display unit 112 is locked into the first supporting portion 115, and the state transition to the "clamshell" state is completed.

Since the lever sheet metal 210 is also moved in the arrow A5 direction shown in FIG. 21A according to movement of the claws 202 in the arrow A5 direction, the engaging portion 210a of the lever sheet metal 210 approaches the claw 212a of the leaf spring 212. Here, if the engaging portion 210a of the lever sheet metal 210 is moved until it moves over a position of the claw 212a of the leaf spring 212, the engaging portion 210a of the lever sheet metal 210 is engaged with the claw 212a of the leaf spring 212, thereby holding the lever sheet metal 210 and the claws 202 at the releasing position. For this reason, a length between a position of the engaging portion 210a of the lever sheet metal 210 at the locking position and the engagement position of the claw 212a of the leaf spring 212 with the engaging portion 210a of the lever sheet metal 210 is designed to be longer than the movement lengths L of the claws 202 due to the contact between the locked portions 110a and the inclined surfaces 202a of the claws 202.

With the above-described configuration, when the state is returned from the "flipped" state to the "clamshell" state, the display unit 112 can be automatically locked into the first supporting portion 115 without the user manipulating the lever 206.

6. CONCLUSION

As described above, according to the embodiment, if the user moves the lever 206 to the releasing position in the "clamshell" state, the lever 206 is held at the releasing position. For this reason, the user can rotate the display unit 112 with respect to the first supporting portion 115 in a state in which his or her finger is lifted from the lever 206. In other words, since it is possible to reliably prevent the finger manipulating the lever 206 from interfering with the movement of the display unit 112, operability when the display unit 112 is flipped can be remarkably improved.

If the display-side case body 110 is rotated with respect to the first supporting portion 115 after the lever 206 is set to the releasing position, the lever 206 and the claws 202 are automatically returned to the locking position. Also, when the state is transitioned from the "tablet" state to the "clamshell" state via the "flipped" state, the locked portions 110a of the display unit 112 are automatically engaged with the claws 202 at the locking position. Therefore, since there is no need for the user to move the lever 206 to the locking position after the transition to the "clamshell" state, operability when the state is returned to the "clamshell" state can be remarkably improved.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, an example in which the first supporting portion 115 is provided with the locking mechanism 200 has been described in the above-described embodiment, but the present disclosure is not limited to such an example. In other words, the technical scope of the present disclose includes an electronic device which has a first member and a second member which can be relatively moved with respect to the first member and in which the first member includes a locking mechanism by which the second member is locked to the first member, and in the above-described embodiment, the first supporting portion 115 is described as an example of the first member, and the display unit 112 is merely described as an example of the second member. Since the display unit 112 can be regarded as the first member, and the first supporting portion 115 can be regarded as the second member which can be relatively moved with respect to the display unit 112 serving as the first member as another example, a configuration in which the display unit 112 is provided with the locking mechanism 200 also belongs to the technical range of the present disclosure. Note that, in this case, a configuration corresponding to the locked portions 110a which are engaged with the claws 202 of the locking mechanism 200 and the claw accommodating spaces 110b is provided at the first supporting portion 115 side.

Also, an example in which the electronic device is a notebook type personal computer has been described in the embodiment, but the electronic device of the present disclosure can be applied to an arbitrary device such as, for example, a desktop type computer, a mobile phone, a smartphone, a video camera, and a digital camera as long as the electronic device of the present disclosure is an electronic device including a locking mechanism. An example in which the movable body serving as the lock target using the locking mechanism is the display unit has been described in the above-described embodiment, but the movable body may be an arbitrary portion of an electronic device, such as a removable type battery pack and a movable type manipulating portion.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An electronic device including:

a supporting body;

a movable body provided in a movable manner with respect to the supporting body; and a locking mechanism configured to lock the movable body to the supporting body, wherein the locking mechanism includes a locking member provided on the supporting body and configured to lock the movable body, a manipulating member connected to the locking member and provided such that the manipulating member is able to be moved between a locking position at which the movable body is locked by the locking member and a releasing position at which the locking of the movable body by the locking member is released, and a holding member configured to hold the manipulating member at the locking position or at the releasing position in accordance with a position of the movable body with respect to the supporting body.

(2)

The electronic device according to (1), wherein the holding member includes a lock holding member configured to hold the manipulating member at the locking position, and a releasing hold member configured to hold the manipulating member at the releasing position and release the holding of the manipulating member by the lock holding member in accordance with the position of the movable body with respect to the supporting body.

(3)

The electronic device according to (2), wherein the lock holding member is configured with an elastic member which biases the manipulating member to the locking position.

(4)

The electronic device according to (2) or (3), wherein, when the movable body is at a position at which the movable body is able to be locked by the locking member, the releasing hold member holds the manipulating member which is moved to the releasing position at the releasing position, and when the movable body is at a position at which the movable body is unable to be locked by the locking member, the releasing hold member does not hold the manipulating member which is moved to the releasing position at the releasing position, and the manipulating member is moved to the locking position by the lock holding member.

(5)

The electronic device according to any one of (2) to (4), wherein the releasing hold member includes an engaging member configured to hold the manipulating member at the releasing position by being engaged with the manipulating member when the manipulating member is moved to the releasing position, and a disengaging member configured to disengage engagement between the engaging member and the manipulating member in accordance with the position of the movable body with respect to the supporting body.

(6)

The electronic device according to (5), wherein, when the movable body is at a position at which the movable body is able to be locked by the locking member, the disengaging member engages the manipulating member which is moved to the releasing position with the engaging member, and when the movable body is at a position at which the movable body is unable to be locked by the locking member, the disengaging member disengages the engagement between the manipulating member which is moved to the releasing position and the engaging member.

(7)

The electronic device according to (6), wherein the disengaging member includes a pedal provided such that the pedal is able to be moved between an allowable position at which the pedal allows the manipulating member which is moved to the releasing position to be engaged with the engaging member and a disengaging position at which the pedal allows the manipulating member which is moved to the releasing position to be disengaged from the engaging member in accordance with whether the pedal comes into contact with the movable body, and an elastic member configured to bias the pedal to the disengaging position, when the movable body is at the position at which the movable body is able to be locked by the locking member, the pedal is positioned at the allowable position due to contact with the movable body, and when the movable body is at the position at which the movable body is unable to be locked by the locking member, the pedal does not come into contact with the movable body and is moved to the disengaging position by the elastic member to disengage the engagement between the manipulating member which is moved to the releasing position and the engaging member.

(8)

The electronic device according to any one of (1) to (7), wherein the locking member has an inclined surface formed on a portion corresponding to a locked portion of the movable body, and when the movable body is moved from a position at which the movable body is unable to be locked by the locking member to a position at which the movable body is able to be locked by the locking member, the inclined surface of the locking member comes into contact with the locked portion of the movable body so that the manipulating member is moved from the locking position toward the releasing position together with the locking member, and if the locked portion moves over a position of the inclined surface, the holding member moves the manipulating member to the locking position so that the locking member is engaged with the locked portion, thereby locking the movable body to the supporting body.

(9)

The electronic device according to any one of (1) to (8), further including:

a main-body-side case body including a manipulating input unit, wherein the supporting body is provided to be rotatable with respect to the main-body-side case body, the movable body is a display-side case body including a display and is provided to be rotatable from a first position to a second position with respect to the supporting body, the movable body is locked to the supporting body by the locking member when the movable body is positioned at the first position, the electronic device serves as a clamshell type terminal when the movable body is locked at the first position, and the electronic device serves as a tablet type terminal when the movable body is rotated to the second position.

(10)

A locking mechanism including:

a locking member provided on a supporting body and configured to lock a movable body provided in a movable manner with respect to the supporting body;

a manipulating member connected to the locking member and provided such that the manipulating member is able to be moved between a locking position at which the movable body is locked by the locking member and a releasing position at which the locking of the movable body by the locking member is released; and a holding member configured to hold the manipulating member at the locking position or at the releasing position in accordance with a position of the movable body with respect to the supporting body.

(11) An electronic device including:
a first member;
a second member provided such that the second member is able to be relatively moved with respect to the first member; and
a locking mechanism configured to lock the second member to the first member,
wherein the locking mechanism includes
a locking member provided on the first member and configured to lock the second member,
a manipulating member connected to the locking member and provided such that the manipulating member is able to be moved between a locking position at which the second member is locked by the locking member and a releasing position at which the locking of the second member by the locking member is released, and
a holding member configured to hold the manipulating member at the locking position or at the releasing position in accordance with a position of the second member with respect to the first member.

(12) A locking mechanism including:
a locking member provided on a first member and configured to lock a second member provided such that the second member is able to be relatively moved with respect to the first member;
a manipulating member connected to the locking member and provided such that the manipulating member is able to be moved between a locking position at which the second member is locked by the locking member and a releasing position at which the locking of the second member by the locking member is released; and
a holding member configured to hold the manipulating member at the locking position or at the releasing position in accordance with a position of the second member with respect to the first member.

REFERENCE SIGNS LIST 100 electronic device
110 display-side case body
110a locked portion
110b claw accommodating space
112 display unit
112a outer frame
114 supporting plate
115 first supporting portion
116 second supporting portion
117 bent coupling portion
120 main-body-side case body
122 input unit
140 projecting portion
171, 172, 173 magnet
200 locking mechanism
202 claw
202a inclined surface
203 protruding portion
204 pedal
204a blade portion
204b contact portion
205 guide groove
206 lever
208 spring
210 lever sheet metal
210a engaging portion
210b through-hole
212 leaf spring
212a claw
212b contact portion
214 torsion coil spring
216 rotary shaft

The invention claimed is:
1. An electronic device, comprising:
a supporting body;
a movable body configured to move with respect to the supporting body; and
a locking mechanism configured to lock the movable body to the supporting body, wherein the locking mechanism includes:
a claw configured to lock the movable body, wherein the claw is on the supporting body;
a lever connected to the claw, wherein the lever is configured to move between a locking position at which the movable body is locked by the claw and a releasing position at which locked movable body is released; and
a holding member comprising:
a spring configured to hold the lever at the locking position; and
a releasing hold member comprising:
a leaf spring configured to hold the lever at the releasing position; and
a disengaging member configured to release the lever held by the leaf spring based on a position of the movable body with respect to the supporting body,
wherein the disengaging member includes a pedal configured to move between an allowable position and a disengaging position,
wherein at the allowable position the pedal is configured to engage the lever at the releasing position with the leaf spring, and
wherein at the disengaging position the pedal is configured to disengage the lever at the releasing position from the leaf spring based on a contact of the pedal with the movable body.

2. The electronic device according to claim 1, wherein the spring comprises an elastic member configured to bias the lever to the locking position.

3. The electronic device according to claim 1, wherein based on a first position of the movable body at which the claw is configured to lock the movable body, the releasing hold member is configured to hold the lever moved to the releasing position at the releasing position, and
based on a second position of the movable body at which the claw is unable to lock the movable body, the releasing hold member is further configured to release the lever moved to the releasing position from the releasing position, and the lever is further configured to move to the locking position by the spring.

4. The electronic device according to claim 1, wherein based on the lever moved to the releasing position, the leaf spring is further configured to hold the lever at the releasing position based on an engagement of the leaf spring with the lever, and the disengaging member is further configured to disengage the engagement between the leaf spring and the lever based on the position of the movable body with respect to the supporting body.

5. The electronic device according to claim 1, wherein
based on a first position of the movable body at which the claw is configured to lock the movable body, the disengaging member is further configured to engage the lever moved to the releasing position with the leaf spring, and
based on a second position of the movable body at which the claw is unable to lock the movable body, the disengaging member is further configured to disengage the engagement between the lever moved to the releasing position and the leaf spring.

6. The electronic device according to claim 1, wherein the disengaging member further includes
an elastic member configured to bias the pedal to the disengaging position,
wherein based on a first position of the movable body at which the claw is configured to lock the movable body, the pedal is configured to contact the movable body and is positioned at the allowable position, and
based on a second position of the movable body at which the claw is unable to lock the movable body, the pedal is configured to disconnect from the movable body and move to the disengaging position by the elastic member to disengage the engagement between the lever moved to the releasing position and the leaf spring.

7. The electronic device according to claim 1, wherein
the claw has an inclined surface formed on a portion corresponding to a locked portion of the movable body, and
based on movement of the movable body from a second position at which the claw is unable to lock the movable body to a first position at which the claw is configured to lock the movable body, the inclined surface of the claw is configured to contact the locked portion of the movable body and the lever is configured to move from the locking position toward the releasing position together with the claw, and based on movement of the locked portion over a position of the inclined surface, the holding member is configured to move the lever to the locking position and the claw is configured to engaged with the locked portion, thereby the movable body is locked to the supporting body.

8. The electronic device according to claim 1, further comprising:
a main-body-side case body including a manipulating input unit, wherein
the supporting body is configured to rotate with respect to the main-body-side case body,
the movable body is a display-side case body including a display,
the movable body is further configured to rotate from a first position to a second position with respect to the supporting body,
the claw is configured to lock the movable body at the first position,
the electronic device is configured to serve as a clamshell type terminal based on the movable body locked at the first position, and
the electronic device is configured to serve as a tablet type terminal based on rotation of the movable body to the second position.

9. A locking mechanism, comprising:
a claw configured to lock a movable body, wherein the movable body is configured to move with respect to a supporting body, and wherein the claw is on the supporting body;
a lever connected to the claw, wherein the lever is configured to move between a locking position at which the movable body is locked by the claw and a releasing position at which the locked movable body is released; and
a holding member comprising:
a spring configured to hold the lever at the locking position; and
a releasing hold member comprising:
a leaf spring configured to hold the lever at the releasing position; and
a disengaging member configured to release the lever held by the leaf spring based on a position of the movable body with respect to the supporting body,
wherein the disengaging member includes a pedal configured to move between an allowable position and a disengaging position,
wherein at the allowable position the pedal is configured to engage the lever at the releasing position with the leaf spring, and
wherein at the disengaging position the pedal is configured to disengage the lever at the releasing position from the leaf spring based on a contact of the pedal with the movable body.

10. An electronic device, comprising:
a first body;
a second body configured to move with respect to the first body; and
a locking mechanism configured to lock the second body to the first body, wherein the locking mechanism includes:
a claw configured to lock the second body, wherein the claw is on the first body;
a lever connected to the claw, wherein the lever is configured to move between a locking position at which the second body is locked by the claw and a releasing position at which the locked second body is released; and
a holding member comprising:
a spring configured to hold the lever at the locking position; and
a releasing hold member comprising:
a leaf spring configured to hold the lever at the releasing position; and
a disengaging member configured to release the lever held by the leaf spring based on a position of the second body with respect to the first body,
wherein the disengaging member comprises:
a pedal configured to move between an allowable position and a disengaging position,
wherein at the allowable position the pedal is configured to engage the lever at the releasing position with the leaf spring, and
wherein at the disengaging position the pedal is configured to disengage the lever at the releasing position from the leaf spring based on a contact of the pedal with the second body; and
an elastic member configured to bias the pedal to the disengaging position,
wherein based on a first position of the second body at which the claw is configured to lock the second body, the pedal is configured to contact the second body and is positioned at the allowable position, and based on a second position of the second body at which the claw is unable to lock the second body, the pedal is configured to disconnect from the second body and move to the disengaging position by the elastic member to disengage the engagement between the lever moved to the releasing position and the leaf spring.

11. A locking mechanism, comprising:
a claw configured to lock a second body, wherein the second body is configured to move with respect to a first body, and wherein the claw is on the first body;
a lever connected to the claw, wherein the lever is configured to move between a locking position at which the second body is locked by the claw and a releasing position at which the locked second body is released; and
a holding member comprising:
  a spring configured to hold the lever at the locking position; and
  a releasing hold member comprising:
    a leaf spring configured to hold the lever at the releasing position; and
    a disengaging member configured to release the lever held by the leaf spring based on a position of the second body with respect to the first body,
wherein the disengaging member comprises:
  a pedal configured to move between an allowable position and a disengaging position,
  wherein at the allowable position the pedal is configured to engage the lever at the releasing position with the leaf spring, and
  wherein at the disengaging position the pedal is configured to disengage the lever at the releasing position from the leaf spring based on contact of the pedal with the second body; and
  an elastic member configured to bias the pedal to the disengaging position,
  wherein based on a first position of the second body at which the claw is configured to lock the second body, the pedal is configured to contact the second body and is positioned at the allowable position, and
  based on a second position of the second body at which the claw is unable to lock the second body, the pedal is configured to disconnect from the second body and move to the disengaging position by the elastic member to disengage the engagement between the lever moved to the releasing position and the leaf spring.

* * * * *